(12) United States Patent
Sheng et al.

(10) Patent No.: US 10,674,078 B2
(45) Date of Patent: Jun. 2, 2020

(54) IMAGE MAPPING AND PROCESSING METHOD, APPARATUS AND MACHINE-READABLE MEDIA

(71) Applicant: Alibaba Group Holding Limited, Grand Cayman (KY)

(72) Inventors: Xiaojie Sheng, Shanghai (CN); Yuxing Wu, Shanghai (CN)

(73) Assignee: Alibaba Group Holding Limited, Cayman Islands (KY)

( * ) Notice: Subject to any disclaimer, the term of this patent is extended or adjusted under 35 U.S.C. 154(b) by 43 days.

(21) Appl. No.: 15/905,611

(22) Filed: Feb. 26, 2018

(65) Prior Publication Data
US 2018/0249076 A1     Aug. 30, 2018

(30) Foreign Application Priority Data

Feb. 27, 2017 (CN) .......................... 2017 1 0109026

(51) Int. Cl.
H04N 5/232       (2006.01)
H04N 19/174      (2014.01)
(Continued)

(52) U.S. Cl.
CPC ....... *H04N 5/23238* (2013.01); *H04N 19/119* (2014.11); *H04N 19/124* (2014.11);
(Continued)

(58) Field of Classification Search
CPC combination set(s) only.
See application file for complete search history.

(56) References Cited

U.S. PATENT DOCUMENTS 6,072,962 A    6/2000 Parulski
6,987,889 B1 * 1/2006 Horowitz ............... H04N 19/61
                                                 375/E7.131
(Continued)

FOREIGN PATENT DOCUMENTS

CN     104159026        11/2014
CN     105791882 A       7/2016
(Continued)

OTHER PUBLICATIONS

PCT Search Report and Written Opinion dated Jun. 1, 2018, for PCT Application No. PCT/US18/19761, 15 pages.
(Continued)

*Primary Examiner* — Alexander Gee
(74) *Attorney, Agent, or Firm* — Lee & Hayes, P.C.

(57) ABSTRACT

Image mapping and processing methods, apparatuses and machine-readable media are disclosed. The methods include obtaining a panoramic video image, and demarcating the panoramic video image into a primary area and at least one ancillary area; determining a primary quantization parameter corresponding to the primary area, and an ancillary quantization parameter corresponding to the ancillary area, wherein the primary quantization parameter is smaller than the ancillary quantization parameter, with the quantization parameter being inversely proportional to an image quality; and encoding the primary area based on the primary quantization parameter, encoding the ancillary area based on the ancillary quantization parameter, and determining a coded panoramic video image.

20 Claims, 17 Drawing Sheets

(51) Int. Cl.

| | | |
|---|---|---|
| *H04N 19/167* | (2014.01) | |
| *H04N 19/119* | (2014.01) | |
| *H04N 19/124* | (2014.01) | |
| *H04N 19/184* | (2014.01) | |
| *H04N 19/17* | (2014.01) | |

(52) U.S. Cl.
CPC ......... *H04N 19/167* (2014.11); *H04N 19/174* (2014.11); *H04N 19/184* (2014.11)

(56) References Cited

U.S. PATENT DOCUMENTS

| | | | |
|---|---|---|---|
| 2012/0162379 A1 | 6/2012 | Dahi et al. | |
| 2012/0229596 A1 | 9/2012 | Rose et al. | |
| 2016/0277772 A1 | 9/2016 | Campbell et al. | |
| 2016/0352791 A1 | 12/2016 | Adams et al. | |
| 2017/0244775 A1* | 8/2017 | Ha | G06T 19/006 |
| 2018/0174619 A1* | 6/2018 | Roy | G11B 27/102 |
| 2018/0220119 A1* | 8/2018 | Horvitz | H04N 21/234363 |

FOREIGN PATENT DOCUMENTS

| | | |
|---|---|---|
| CN | 105898254 A | 8/2016 |
| CN | 106454321 A | 2/2017 |
| CN | 106454364 A | 2/2017 |

OTHER PUBLICATIONS

English translation First Chinese Office Action dated Dec. 18, 2019 for Chinese Patent Application No. 201710109026.3, a counterpart foreign application of U.S. Appl. No. 15/905,611, 28 pages.

First Chinese Search Report dated Dec. 10, 2019, for Chinese Patent Application No. 201710109026.3, 2 pages.

Kashyap Kammachi-Sreedhar et al; "Viewport-adaptive Encoding and Streming of 360-degree Video for Virtual Reality Applications", retrieved on Jan. 24, 2020 at https://ieeexplore.ieee.org/cart/download.jsp?partnum=7823693&searchProductType=IEEE%20Conferences, IEEE Transactions, Published 2016, pp. 583-586.

* cited by examiner

IMAGE MAPPING AND PROCESSING METHOD, APPARATUS AND MACHINE-READABLE MEDIA

CROSS-REFERENCE TO RELATED PATENT APPLICATIONS

This application claims priority to Chinese Patent Application No. 201710109026.3, filed on 27 Feb. 2017, entitled "Image Mapping and Processing Method, Apparatus and Machine-Readable Media thereof," which is hereby incorporated by reference in its entirety.

TECHNICAL FIELD

The present disclosure relates to the field of image processing technologies.

BACKGROUND

A 360-degree panorama video has a wide range of coverage and can cover an entire viewing angle or perspective of a user. Therefore, the resolution thereof is usually much larger than a conventional flat surface video. In order to achieve a balance between a compression bit rate and the smoothness of transmission, it is necessary to enhance the resolution of the panoramic video as much as possible while simultaneously reducing the bit rate, that is, achieving a reduction in the bit rate when transcoding the high-resolution panoramic video.

Currently, a common method of reducing a coding bit rate is to reduce an area of a panoramic video that needs to be coded through mapping. However, reducing the area of coded panoramic video through mapping only offers a limited range to reduce the coding bit rate.

Therefore, an urgent technical challenge facing one skilled in the art is how to effectively reduce a coding bit rate of a panoramic video.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The present disclosure provides a method, an apparatus and a machine-readable media for image mapping and processing. The method includes acquiring a panoramic video image and demarcating the panoramic video image into a primary area and at least one ancillary area; determining a primary quantization parameter corresponding to the primary area, and an ancillary quantization parameter corresponding to the ancillary area, wherein the primary quantization parameter is smaller than the ancillary quantization parameter, and the quantization parameter is inversely proportional to an image quality; and encoding the primary area based on the primary quantization parameter, encoding the ancillary area based on the ancillary quantization parameter, and determining a coded panoramic video image.

DETAILED DESCRIPTION

Figure 1:
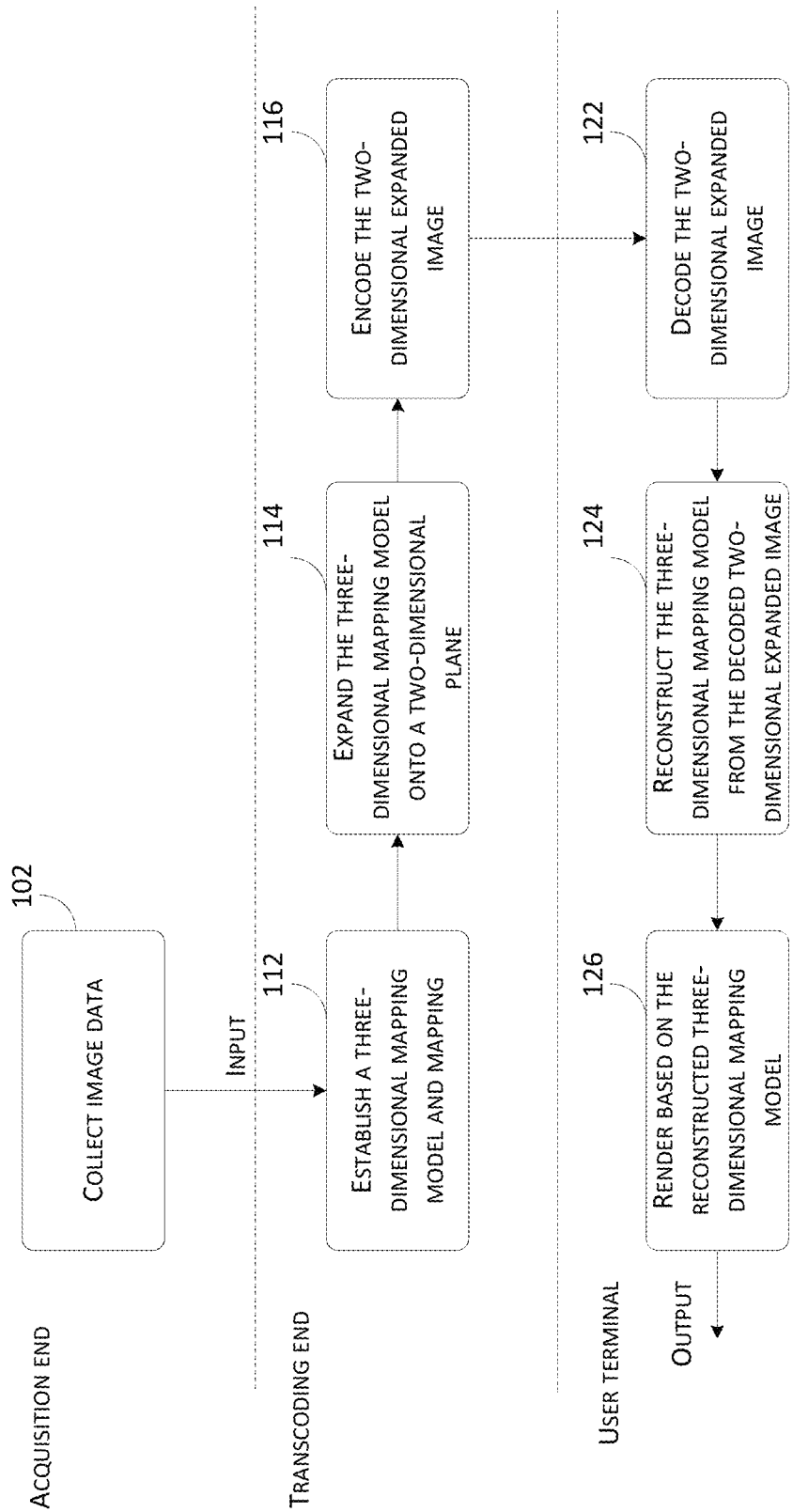
FIG. 1 is a flowchart illustrating a process for processing a panoramic video at a transcoding end and a user terminal according to embodiments of the present disclosure.

To make the foregoing objectives, features, and advantages of the present disclosure clearer and easier to understand, the present disclosure is described in further detail hereinafter with reference to accompanying drawings and exemplary implementations.

A variety of different forms of modifications and replacements can be easily performed or derived from the present disclosure, and exemplary embodiments of the present disclosure have been shown by way of figures and will be described in detail herein. It should be understood, however, that the foregoing content is not intended to limit the inventive concepts to the exemplary embodiments that are disclosed. On the contrary, the specification and the appended claims of the present disclosure are intended to cover all such modifications, equivalents, and replacements.

In the present specification, "one embodiment", "an embodiment", and "one particular embodiment", etc. mean that the embodiment being described may include a particular feature, structure, or characteristic. However, each embodiment may or may not necessarily include the particular feature, structure, or characteristic. In addition, such phrases do not necessarily refer to a same embodiment. In addition, whether expressly stated or not, particular features, structures, or characteristics that are described in connection with an embodiment may be considered to be related to other embodiments within a scope known by one of ordinary skill in the art. In addition, it should be understood that the following possible items may be included in a list of "including at least one of A, B and C": (A); (B); (C); (A and B); (A and C); (B and C); or (A, B and C). Also, items listed in a form of "at least one of A, B or C" may mean (A); (B); (C); (A and B) C); or (A, B and C).

In some cases, the disclosed embodiments may be implemented as hardware, firmware, software, or any combination thereof. The disclosed embodiments may also be implemented as instructions carried or stored in one or more transitory or non-transitory machine-readable (e.g., computer-readable) storage media that may be executed by one or more processors. A machine-readable storage media may be implemented as a storage device, a mechanism, or other physical structure for storing or transmitting information in a form that is readable by a machine (e.g., a volatile or non-volatile memory, a media disk, other media, or another physically structural device).

In the drawings, some structural or methodological features may be shown in a particular arrangement and/or order. However, such specific arrangements and/or orders may not be necessary. Rather, in some implementations, such features may be arranged in different ways and/or in different orders rather than the ones as shown in the drawings. Furthermore, content included in the features of a structure or a method in a particular drawing is not meant to imply that such features are required in all embodiments, and in some embodiments, these features may not be included, or may be combined with other features.

A panoramic image usually refers to an image that fit a normal and effective viewing angle of a human's eyes (approximately 90° in a horizontal direction and 70° in a vertical direction), or includes a binocular dimming angle (approximately 180° in a horizontal direction and 90° in a vertical direction), or even encompasses a 360° full-view. A 360° panoramic video displays a very broad range that can cover an entire viewing angle or perspective of a user. As a result, a 360° panoramic video is a hot spot in a field of VR (Virtual Reality), which can provide users with an immersive video-viewing experience.

FIG. 1 is a flowchart illustrating a process for processing a panoramic video at a transcoding end and a user terminal according to the embodiments of the present disclosure. Box 102 describes an operation in which an acquisition end can collect image data. In an embodiment, the acquisition end can be a device containing a camera, and the device can have one or more cameras. The number of camera can be determined based on a camera range. For example, a fisheye lens can photograph a 360° panoramic image. In another embodiment, the acquisition end can be a device in a user end, such as a mobile phone, a backup camera, etc. In still another embodiment, the acquisition end can also be a service-end device, such as a panoramic image acquisition device corresponding to a map. In yet another embodiment, the acquisition end can also be a VR (virtual Reality) video acquisition device, for example. An image that is captured can be sent to the transcoding end for processing. In the transcoding end, a spherical panoramic image is first constructed according to a spherical model. The spherical panoramic image is an image taken at a 360° complete range. However, a display range and a resolution of a spherical panoramic image are usually wide. Thus, a spherical panoramic image needs to be compressed. As a result, the transcoding end may map and encode a spherical panoramic image.

Block 112 describes establishing a three-dimensional mapping model, and mapping the spherical panoramic image at the transcoding end. A resolution of an image is reduced by mapping into a three-dimensional mapping model. Therefore, the transcoding end can establish three-dimensional mapping models, such as a Cubemap model, a Pyramid model, an Equirectangular model, etc., according to needs. After the three-dimensional mapping model is determined, the spherical panoramic image can be mapped by using the three-dimensional mapping model. For example, a sampling point on the spherical panoramic image that corresponds to a point on the three-dimensional mapping model can be determined, and sampling is performed on the sampling point, thus obtaining a mapped panoramic video image.

Block 114 describes expanding the mapped panoramic video image onto a two-dimensional plane. In other words, a planar expansion mode is determined according to characteristics of the three-dimensional mapping model, and the mapped panoramic video image obtained is expanded according to the planar expansion mode to obtain a corresponding two-dimensional image, i.e., two-dimensional panoramic video image.

Block 116 describes encoding the two-dimensional panoramic video image. A method of encoding the image can be determined according to needs. Corresponding parameters of the encoding are also determined according to the encoding method and needs, and the expanded two-dimensional panoramic video image is encoded according to the encoding method. The coded panoramic video image is sent to the user terminal. In the embodiments of the present disclosure, the user terminal may be a terminal device at the user end, such as a mobile terminal (which includes a mobile phone, a tablet computer, etc.), a PC, or VR device, etc.

Block 122 describes decoding the received panoramic video image at the user end. The decoding method is corresponding to the encoding method and can be set according to needs. Therefore, after receiving the panoramic video image transmitted by the transcoding end, the panoramic video image can be decoded according to the decoding method to obtain a two-dimensional panoramic video image.

Block 124 describes reconstructing the three-dimensional mapping model. According to the decoded two-dimensional panoramic video image, the three-dimensional mapping model corresponding to the transcoding end can be reconstructed.

Box 126 describes performing rendering based on the reconstructed three-dimensional mapping model. After reconstructing the three-dimensional mapping model, the image can be rendered and outputted based on the reconstructed three-dimensional mapping model and a viewing viewing angle. The viewing angle can be determined by a user's viewing angle in real time. Each frame of the image can be processed and outputted in accordance with the above method, i.e., outputting an entire panoramic video.

In the embodiments of the present disclosure, a device such as a server at the transcoding end, can perform mapping based on a three-dimensional mapping model, with different models corresponding to different mapping modes. Although a three-dimensional mapping model can reduce an area of panoramic video that needs to be encoded, a decrease in a bit rate is still not completely achieved. In other words, reducing an area of a coded panoramic video through mapping only offers a limited amount of reduction in a coding bit rate. Therefore, in the embodiments of the present disclosure, an adaptive quantization coding method is used to effectively reduce a bit rate and to provide a user with a panoramic video with a higher resolution and a lower bit rate.

Figure 2:
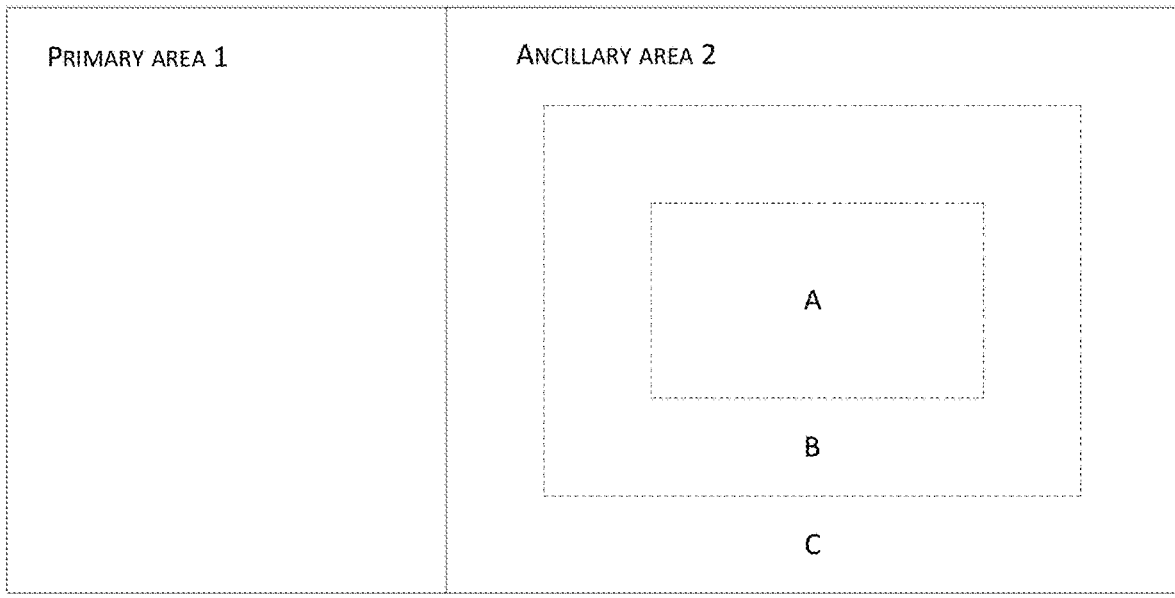
FIG. 2 is a schematic diagram illustrating an adaptive image encoding scheme according to the embodiments of the present disclosure.

FIG. 2 is a schematic diagram illustrating an adaptive image encoding scheme according to the embodiments of the present disclosure.

In implementations, any three-dimensional mapping model can be used to obtain a panoramic video image by mapping. Based on viewing angle information, the panoramic video image is then demarcated, and a primary area and at least one ancillary area are determined. FIG. 2 is a mapped panoramic video image (i.e., a two-dimensional planar expansion diagram). The panoramic video image can be demarcated into a primary area 10 and an ancillary area 20 after being demarcated based on the viewing angle Information. The ancillary area 20 may include three sub-areas, namely, sub-areas A, B, and C. The present embodiment adopts an adaptive quantization coding method, in which different areas may adopt different quantization parameters for encoding. Therefore, a primary quantization parameter corresponding to a primary area can be determined separately from an ancillary quantization parameter corresponding to an ancillary area. The primary quantization parameter is smaller than the ancillary quantization parameter. A viewing angle is a range or scope that human eye sights normally see and perceive. In the present disclosure, respective ranges or scopes of a primary viewing angle and an ancillary viewing angle are defined based on practical needs or requirements, such as parameters of a server end and/or a user end. For example, when a user end (i.e., a VR device) has a visual angular range of 45°, a primary area is a 45° range, and other area(s) is/are ancillary area(s).

Quantization is a process of reducing secondary information when achieving visual recovery while keeping the loss of visual effect to a minimum. Quantization parameters (QP) are related to the quality of coding and a bit rate of an image, and are one of the factors that determine the quality of a video quality stream. In image encoding, a quantization parameter QP is a sequence number for a quantization step Qstep. The quantization parameter QP is proportional to a quantization loss of an image and thus inversely proportional to the quality of the image. In other words, the smaller the QP value is, the finer the quantification coefficient from the Qstep is, and the smaller the quantization loss of the image is. On the contrary, the larger the value of QP is, the coarser the quantification coefficient from the Qstep is, and the greater the quantization loss of the image is.

One example is H.264 codec. A relationship between a quantization parameter QP and a quantization step Qstep is as follows. A quantization step Qstep has a total of 52 values. A quantization parameter QP is a sequence number of the quantization step Qstep, ranging from 0 to 51. When QP is at the minimum value of 0, this means that an associated quantization is the finest. Conversely, when QP is at the maximum value of 51, the quantization is the coarsest. Qstep increases as QP increases, and Qstep is doubled when QP increases by 6. For example, in x.264 coding, for a macroblock coding, the larger the QP value is, the lower the coding quality of the macroblock is, and the lower the bit rate of the corresponding coding is. On the contrary, the smaller the QP value is, the higher the image quality of the macroblock is, and the higher the corresponding bit rate is. Therefore, a QP value is related to an adjusted bit rate and a quality of an image in x.264 and various other coding standards. An adaptive quantization refers to setting different QP values for different macroblocks (for example, a macroblock of a block size of 16*16 in x.264) within a same frame according to a certain algorithm during video encoding.

Therefore, in implementations, the primary area is encoded based on the primary quantization parameter, and the ancillary area is encoded based on the ancillary quantization parameter. In other words, a coded panoramic video image can be obtained by processing a panoramic video image using an adaptive quantization coding method, and can then be transmitted to a user end for decoding, mapping, rendering, and presentation.

Figure 3:
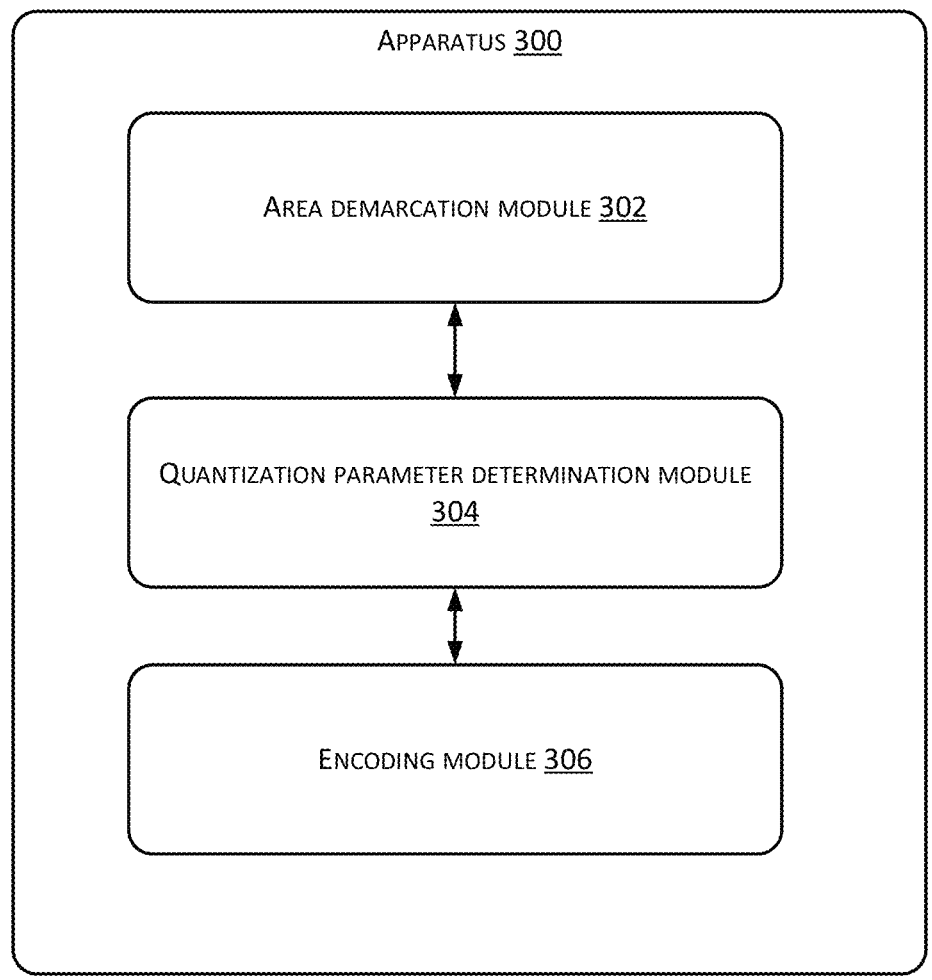
FIG. 3 is a block diagram illustrating an image processing apparatus according to the embodiments of the present disclosure.

The embodiments of the present disclosure further provide an image processing apparatus 300, which can be applied to a server at a transcoding end, and other service end devices. Referring to FIG. 3, a block diagram illustrating an image processing apparatus according to the embodiments of the present disclosure is shown, which may specifically include the following modules.

An area demarcation module 302 is configured to obtain a panoramic video image and to demarcate the panoramic video image into a primary area and at least one ancillary area.

A quantization parameter determination module 304 is configured to determine a primary quantization parameter corresponding to the primary area, and an ancillary quantization parameter corresponding to the ancillary area, wherein the primary quantization parameter is smaller than the ancillary quantization parameter, and the quantization parameter is inversely proportional to an image quality.

An encoding module 306 is configured to encode the primary area according to the primary quantization parameter and encode the ancillary area according to the ancillary quantization parameter to determine a coded panoramic video image.

The apparatus 300 establishes a three-dimensional mapping model based on a viewing angle mapping. In other words, the apparatus 300 uses the three-dimensional mapping model to perform image mapping and obtains a panoramic video image after two-dimensional expansion. After the image is mapped and is two-dimensionally expanded, the image can also be filtered to smooth high-frequency components. Therefore, in the present embodiment, the panoramic video image that is acquired from the area demarcation module 302 and determined by mapping may also be a mapped and filtered panoramic video image. The panoramic video has a wide scope of display, which can cover an entire viewing angle or perspective of a user. The viewing angle includes a primary viewing angle currently viewed by a user, and another viewing angle (called an ancillary viewing angle) that is not viewed by the user. Since the ancillary viewing angle is an area not viewed by the user, a waste in a compression bit rate will result if a same encoding used for the primary viewing angle is adopted. Therefore, in the embodiments of the present disclosure, quantization coding is executed based on areas distinguished by a viewing angle of a user so as to reduce a compression bit rate.

Therefore, the apparatus 300 can determine viewing angle information based on a viewing angle of a user. The viewing angle information is used to represent information corresponding to a primary viewing angle used by the user. An image area in which the primary viewing angle of the user is located can be determined according to a mapping model. Therefore, the area demarcation module 302 may demarcate a panoramic video image into a primary area, and at least one ancillary area based on viewing angle information, wherein the primary area is an area corresponding to a primary viewing angle used by a user, and the ancillary area is an area corresponding to an ancillary viewing angle and being not viewed by the user. Thus, when determining quantization parameters corresponding to different areas, the quantization parameters can be adaptively adjusted according to whether an area is being viewed or not. The quantization parameter determination module 304 can determine a primary quantization parameter corresponding to the primary area and an ancillary quantization parameter corresponding to the ancillary area. Among these areas, the primary area is an area primarily viewed by the user, and thus needs to be relatively finely quantized. The ancillary area is an area that is not viewed by the user or an area that is not at a focus of sight, and thus can be quantized relatively coarsely. In other words, the primary quantization parameter is smaller than ancillary quantization parameter. The encoding module 306 subsequently encodes the primary area according to the primary quantization parameter, and encodes the ancillary area according to the ancillary quantization parameter, i.e., processing the panoramic video image by using an adaptive quantization coding method, and determining a coded panoramic video image.

In short, a mapped panoramic video image that is determined to be mapped is obtained. The panoramic video image is demarcated into a primary area and at least one ancillary area based on viewing angle information. Different quantization parameters are assigned for different areas, i.e., setting a primary quantization parameter corresponding to the primary area, and setting an ancillary quantization parameter corresponding to the ancillary area, with the primary quantization parameter being smaller than the ancillary quantization parameter. The primary region is encoded based on the primary quantization parameter, and the ancillary area is encoded based on ancillary quantization parameter to determine a coded panoramic video image. A bit rate is effectively reduced using an adaptive coding. Meanwhile, a relatively small primary quantization parameter is used in encoding of the primary area corresponding to a user viewing angle, in order to guarantee a sufficient resolution for the primary area and to ensure a normal viewing of a video by a user.

The embodiments of the present disclosure may be applied to panoramic video images that are expanded and mapped by various three-dimensional mapping models. Different three-dimensional mapping models correspond to different mapping modes. In the present embodiment, a three-dimensional mapping model includes at least one of a Cubemap model, a Pyramid model, an equirectangular model, and may also include other three-dimensional mapping models, which are not exhaustively listed in the present disclosure and should not be construed as limiting the embodiments of the present disclosure. Corresponding mapping modes include at least one of a Cubemap mapping mode corresponding to the Cubemap model, a Pyramid mapping mode corresponding to the Pyramid model, a Spherical mapping mode corresponding to the equirectangular model, and mapping modes corresponding to other three-dimensional mapping models.

Figure 4:
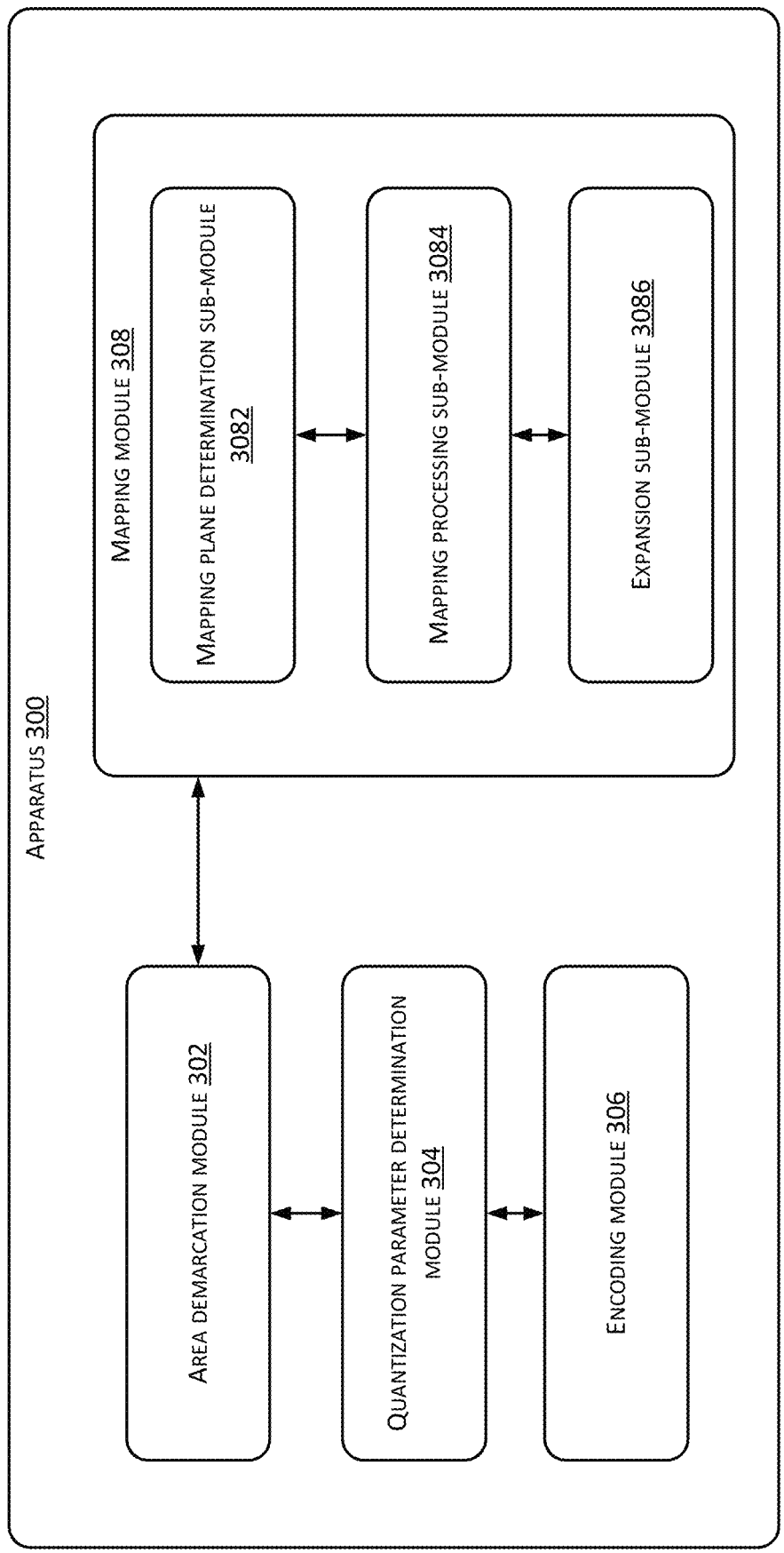
FIG. 4 is a block diagram illustrating an image processing apparatus according to the embodiments of the present disclosure.

FIG. 4 shows a block diagram illustrating an image processing apparatus according to the embodiments of the present disclosure is shown, which may include the mapping module 308, the area demarcation module 302, the quantization parameter determination module 304, and the encoding module 306.

The area demarcation module 302 is used to determine viewing angle information according to a mapping model, demarcate a panoramic video image according to the viewing angle information, and determine a primary area and at least one ancillary area. Based on a mapping method of the three-dimensional mapping model, the area demarcation module 302 can determine viewing angle information of a primary viewing angle of a user. For example, when multi-path video images are mapped, a viewing angle can be ascertained based on which path a user is watching. In another example, based on a three-dimensional mapping model corresponding to a mapping mode, a corresponding viewing range of a primary viewing angle a user views at can be determined. In turn, a panoramic video image is demarcated into a primary area and at least one ancillary area using information of the viewing angle.

Since a panoramic video can be mapped by using a variety of three-dimensional mapping models, and different mapping modes may adopt different ways to determine a primary and ancillary area(s), the present embodiment uses a plurality of mapping modes as examples to describe an adaptive quantization coding of a panoramic video image.

In implementations, a Cubemap mapping mode corresponding to a Cubemap model is used.

Figure 5A:
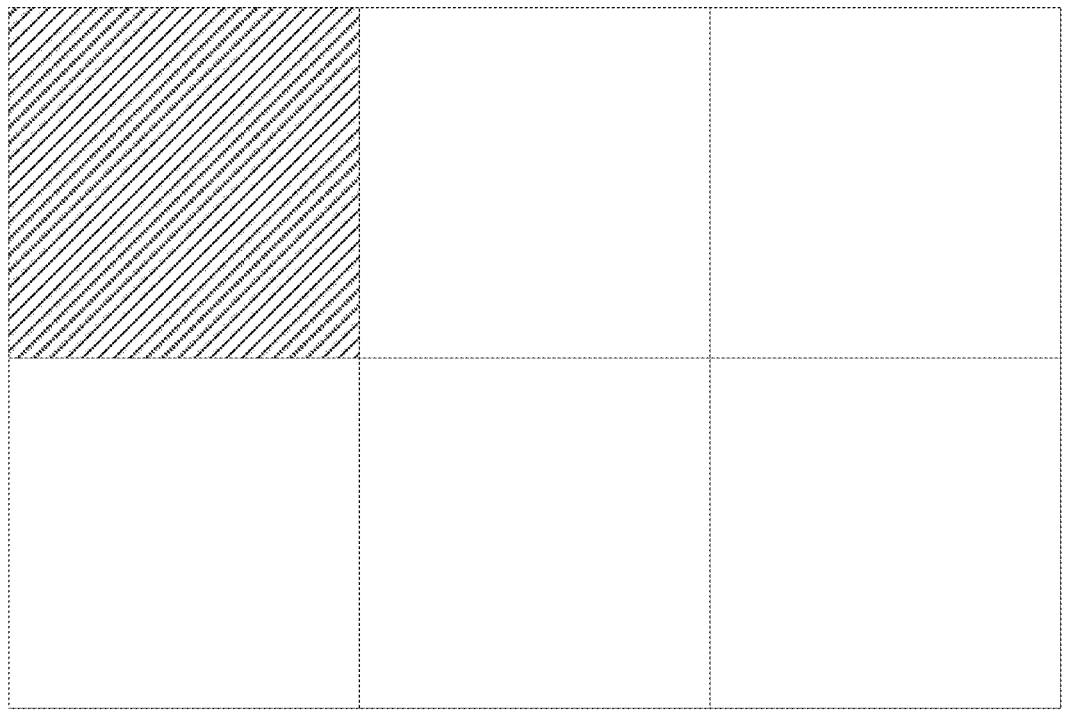
FIGS. 5A, 5B and 5C are schematic diagrams illustrating a Cubemap mapping model according to the embodiments of the present disclosure.

A Cubemap model maps a spherical panoramic video image to a hexahedron and expands the hexahedron to a two-dimensional image. For each point on a hexagon of the Cubemap model, when the respective point is connected with the center of the panoramic video image, a point of intersection can be found on a spherical surface. As a result, through a line going through the point of intersection and the center of the panoramic video image, a one-to-one mapping relationship can be established between points on the spherical surface corresponding to the Cubemap hexahedron and points on the panoramic spherical video. Mapping a panoramic spherical video into a Cubemap hexahedron can thus be realized. After the Cubemap hexahedron has been mapped, six faces of a cube can be expanded into a flat image. An example of a panoramic video image that is mapped after a two-dimensional plane expansion is shown in FIG. 5A. The panoramic video image includes six expanded rectangles respectively corresponding to image data of upper, lower, left, right, front and back of a hexahedron. Since the six sides of the two-dimensionally expanded panoramic video image in Cubemap correspond to a viewing angle of a user in six directions respectively, in one example, encoding quantization can be adaptively performed according to six views of the user from top, bottom, left, right, front, and back. Apparently, in practical applications, the number of views of a Cubemap corresponding to a panoramic video image may be set as required, which is not limited in the embodiments of the present disclosure.

After Cubemap mapping and expansion, the 360° panoramic video image is gone through adaptive quantization processing according to a viewing angle of the user. A six-way adaptive quantization processing for six viewing angles of a user as described above is used as an example. One out of the six viewing angles is a viewing angle used by the user. As shown in FIG. 5A, a viewing angle in the upper left corner is taken as the viewing angle of the user. A quantization parameter of an area corresponding to this viewing angle used by the user can be reduced, and quantization parameters of areas corresponding to the other viewing angles can be increased, so that the quantization parameters corresponding to the other view angles are higher than the corresponding quantization parameter of the viewing angle used by the user. As a result, the user can watch an image of a higher compression quality from this viewing angle, whereas compression bit rates in the remaining parts of the image are reduced due to higher quantization parameters. Therefore, the method maintains a high clarity in a viewing angle used by a user and reduces compression bit rates for the remaining video areas. The above method is implemented for M viewing angles of a user (such as viewing angles corresponding to upper, lower, left, right, front, and back six angles of the user as shown in FIG. 5A) respectively to perform transcoding of adaptive quantization. Six-channel adaptive quantization video encoding streams are obtained at the transcoding end. When a user of the terminal began to watch, it is possible to timely switch, based on a change in a viewing angle of the user, to an adaptive quantization stream with reduced quantization parameters that correspond to a primary viewing angle where the user is watching. As a result, the user can always get a high-quality viewing experience.

The area demarcation module 302 is configured to, for the panoramic video image obtained by the Cubemap mapping model, select a corresponding viewing path as a target path of the viewing angle, set an area corresponding to the target path of the viewing angle as the primary area, and set area(s) other than the area corresponding to the target path of the viewing angle as the ancillary area(s).

The area demarcation module 302 obtains a panoramic video image determined by a Cubemap mapping model, determines M viewing angles for the image, with each viewing angle corresponding to one channel of a video stream. A path may initially be selected to be a target path, and a path corresponding to what a user is watching (i.e., a corresponding viewing path) is then adjusted during a video transmission process and the path is set to be a target path of a viewing angle where the viewing angle is located. An area corresponding to the target path of viewing angle is set to be primary area, and other area(s) corresponding to other path(s) located outside the target path is/are set as ancillary area(s). As shown in FIG. 5A, an area at the upper left corner is set to be a primary area, and other areas are set to be ancillary areas. The quantization parameter determination module 304 can then determine a primary quantization parameter corresponding to the primary area and respective ancillary quantization parameters corresponding to the ancillary areas. The encoding module 306 encodes the primary area according to the primary quantization parameter, and encodes the ancillary areas according to the respective ancillary quantization parameters, thus processing the panoramic video image using an adaptive quantization coding scheme, and determining a coded panoramic video image.

In implementations, the area demarcation module 302 is configured to select a sub-area within the corresponding area of the target path to be the primary area, set sub-area(s) in the corresponding area of the target path other than the primary area as first level ancillary area(s), demarcate area(s) of path(s) other than the target-path into second level ancillary sub-area(s) to Nth level ancillary area(s), wherein N is an integer equal or larger than two. In order to effectively reduce a compression rate, an ancillary area can be demarcated into a plurality of different levels of ancillary areas, so as to determine ancillary quantization parameters of multiple levels and increase the quantization parameters level by level. Therefore, the area demarcation module 302 can demarcate the ancillary area(s) into first level to Nth level ancillary areas, wherein N is an integer equal to or larger than two. The area demarcation module 302 can also select a sub-area within an area corresponding to the target path to be the primary area, set sub-area(s) of the corresponding area of the target path other than the primary area as first level ancillary area(s), and demarcate area(s) corresponding to path(s) other than the target path into second level ancillary area(s) to Nth level ancillary area(s). First level to Nth level ancillary quantization parameters are respectively assigned to the first level ancillary area(s) to the Nth level ancillary area(s), wherein a value of an ancillary quantization parameter increases as a level thereof increases. An area corresponding to a viewing angle opposite to the viewing angle viewed by the user can be set to be the Nth level ancillary area(s). For example, FIG. 5 has six viewing angles including the top, bottom, left, right, front, back, and front as described above. If a shaded area in the upper left corner is a front corresponding viewing angle, an area corresponding to a back corresponding viewing angle can be set to be a Nth level ancillary area, thus processing the adaptive quantization coding according to a viewing angle viewed by a user and reducing a bit rate.

Another example is a Pyramid mapping mode corresponding to a Pyramid model.

The Pyramid model can map a panoramic video to multi-channel VR videos based on different viewing angles of a user, thus lowering a resolution and a transmission bit rate of each VR video. In this technical framework, high-resolution image data can be presented to the user at a primary viewing angle viewed by the user, and low-resolution image data can be displayed in an area distant from the primary viewing angle of the user. As a result, the model enables the user to view high definition content at the primary viewing angle while keeping an overall compression image area and a bit rate of the panoramic video at a relatively low level.

First, an input VR panoramic video is decoded and fed into multiple parallel multi-viewing angle mapping modules. The mapping modules generate multi-channel VR panoramic videos with different resolutions at different viewing angles through a mapping algorithm, based on an original input VR video from different viewing angles. The generated multi-channel panoramic videos are sent to a VR panoramic video encoding module for encoding and output. An encoded output stream is sent to a module that slices and packages the stream, and this module outputs the stream after slicing and packaging based on a transport layer protocol such as HLS. When viewed by a user of a terminal, the terminal promptly downloads a video stream in response to a change in a viewing angle of the user, so that the user can obtain a high-definition viewing experience in every viewing angle.

Figure 6A:
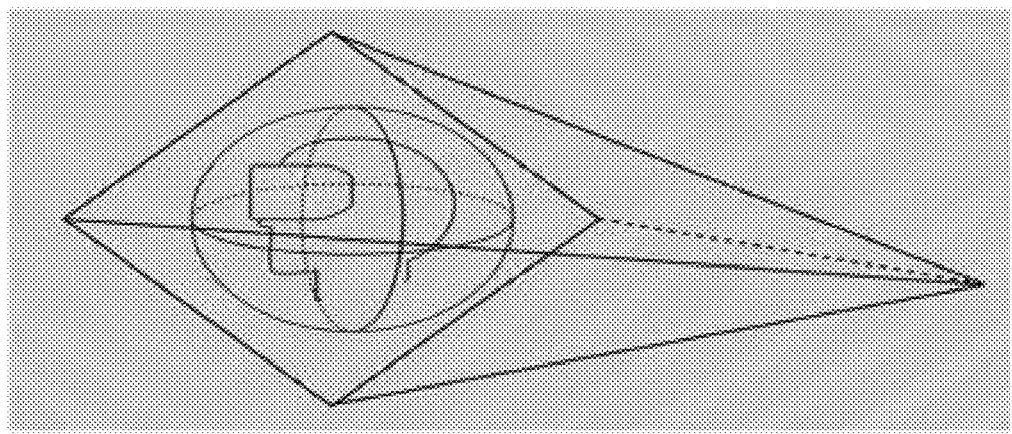
FIGS. 6A, 6B and 6C are schematic diagrams illustrating a Pyramid mapping method according to the embodiments of the present disclosure.
Figure 6B:
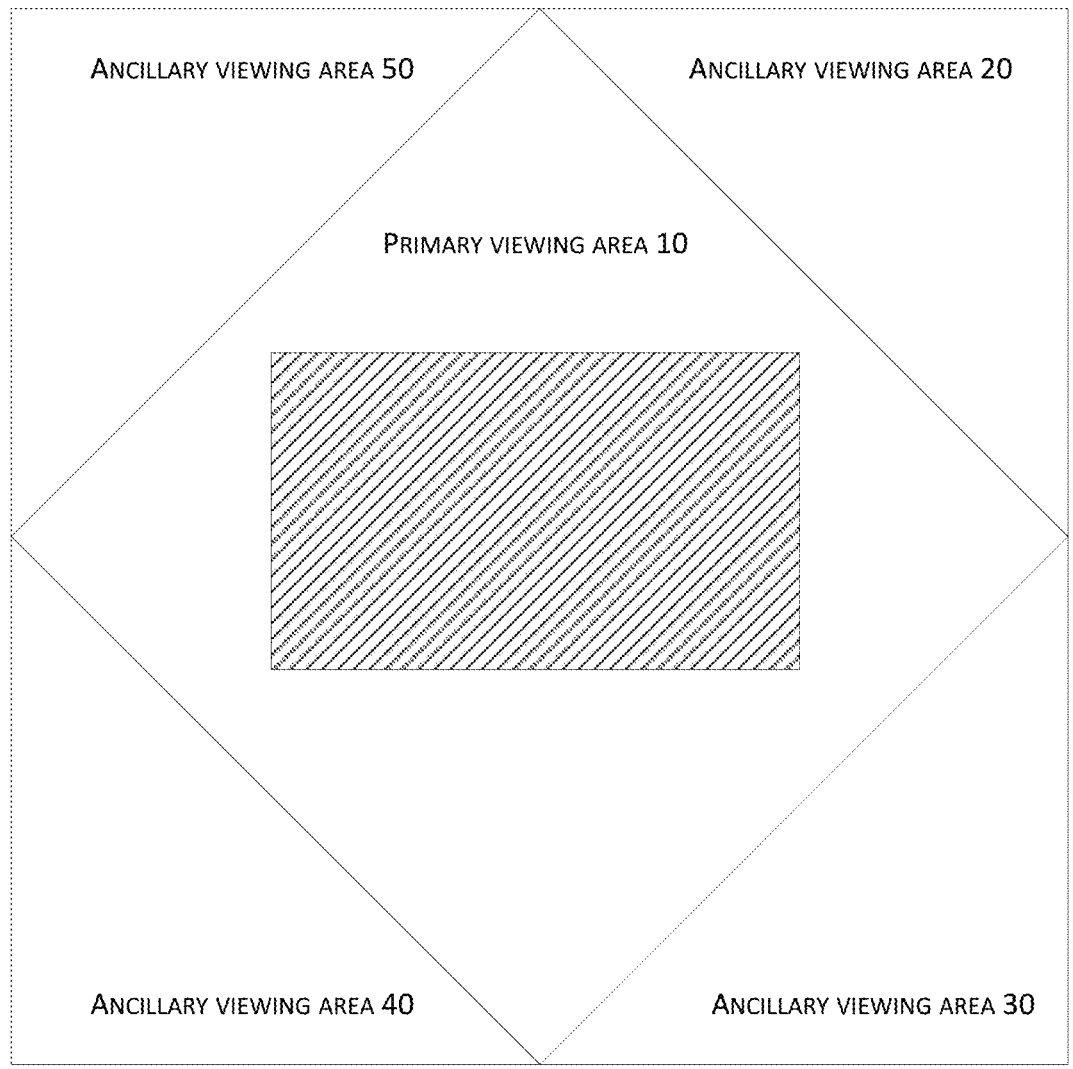
Figure 6C:
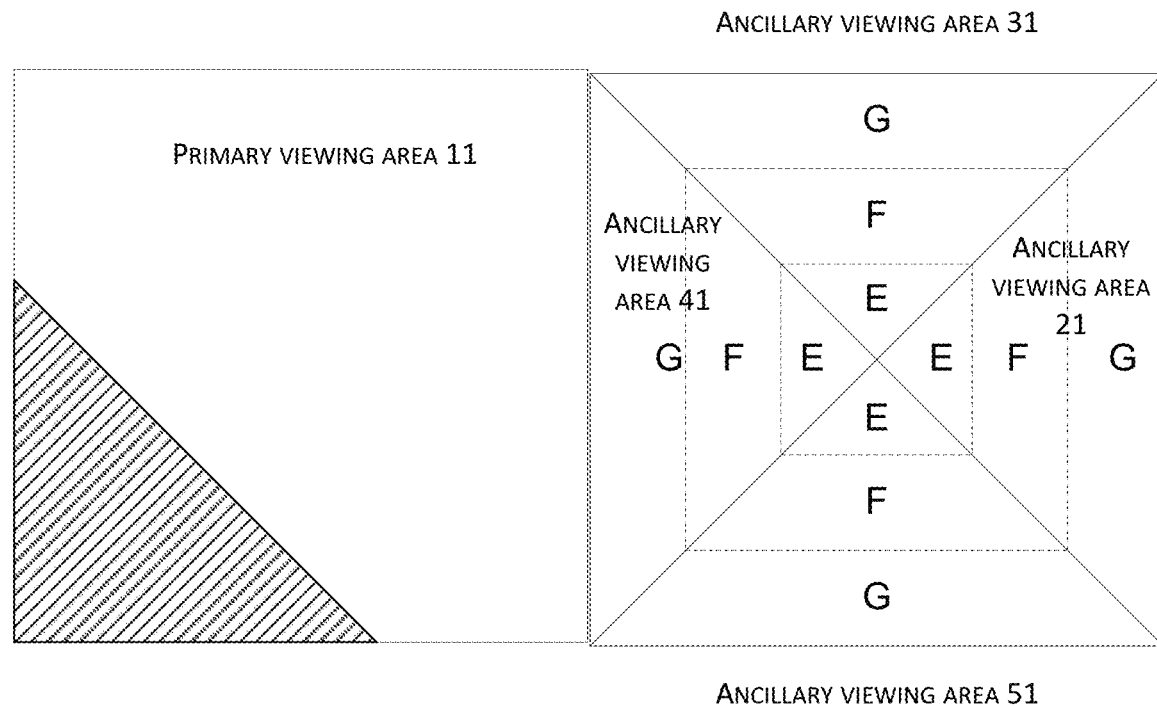

A mapping mode corresponding to the Pyramid model has already performed mapping according to a change in a viewing angle of a user. FIG. 6A shows a schematic diagram illustrating underlying principles of a Pyramid mapping method according to the embodiments of the present disclosure. Therefore, an image corresponding to a primary viewing angle viewed by a user has a higher resolution, and images of other viewing angles have a lower resolution. A vertex of a rectangular pyramid in the Pyramid mapping model represents a location that is the farthest from a viewing angle viewed by the user. A variety of panorama video images can be obtained after mapping and expansion of the Pyramid mapping model. An example of a panoramic video image is shown in FIG. 6B. A rhombus area surrounded by four triangular areas in the image is a primary viewing angle area 10, and the triangular areas are ancillary viewing angle areas. In other words, the panoramic video image includes one primary viewing angle area 10 and four ancillary viewing angle areas (i.e., 20-50). Another example of a panoramic video image is shown in FIG. 6C, which includes a primary viewing angle area 11 and ancillary viewing angle areas 21-51. A vertex common to the ancillary viewing angle areas may be a vertex where an area having the highest high-frequency component is located. Therefore, an example of this type of expansion may also combine these four ancillary viewing angle areas into one ancillary viewing angle area.

The embodiments of the present disclosure relate to an adaptive quantization coding based on a change in a viewing angle of a user. The adaptive quantization coding may be performed after Pyramid mapping which is also based on the change in the viewing angle of the user, i.e., providing an adaptive quantization algorithm for each Pyramid mapping result of each viewing angle. A primary area may be determined according to a primary viewing angle that is determined through mapping. For example, a primary viewing angle area can be set to be a primary area, or a primary area corresponding to a viewing angle may be further demarcated from the primary viewing angle area, as shown in slanted areas of FIG. 6B and FIG. 6C. Specifically, a primary area determined in a primary viewing angle area is determined according to an actual viewing angle of a user. For example, adaptive quantization coding can be implemented through real-time adjustment according to a feedback of a video stream. An ancillary viewing angle area is determined as an ancillary area. If only a part of a primary viewing angle area is a primary area, remaining areas in the primary viewing angle area are also demarcated as ancillary areas. For example, areas other than slashed areas in FIGS. 6B and 6C are ancillary areas. A quantization parameter QP of a primary area is reduced, while a quantization parameter of an ancillary area is increased in quantization coding. Therefore, when a user is viewing at a viewing angle towards a slanted line region, an image with a higher compression quality can be seen, and bit rates of compression for remaining parts of the image are further reduced due to higher quantization parameters, thereby improving a viewing resolution of a primary viewing angle of the user by the Pyramid mapping, while reducing compression rates of other parts of an entire video. As such, a distribution of compression rates tends to have a viewing quality increased within the primary viewing angle of the user. In this way, an adaptive quantization algorithm can be further superimposed on a panoramic video coding on a basis of a resolution mapping that is adaptive to the perspective of a user, thus putting concentration of a coded bit rate towards a viewing angle of the user. Based on an adaptive resolution, an image quality within the viewing angle of the user is further enhanced in the compression module.

The area demarcation module 302 is configured to determine a primary viewing angle area and ancillary viewing angle area(s) of a panoramic video image obtained by a Pyramid mapping model for a panoramic video image, determine a primary area based on the primary viewing angle area, and set the ancillary viewing angle area(s) as ancillary area(s). The area demarcation module 302 obtains a panoramic video image determined by a Pyramid mapping model. The panoramic video image includes both a primary viewing angle area and ancillary viewing angle area(s). The area demarcation module 302 determines a primary area based on the primary viewing angle area, and sets the ancillary viewing angle area(s) to be ancillary area(s). Furthermore, the area demarcation module 302 reduces a quantization parameter corresponding to the primary area increases ancillary quantization parameter(s) corresponding to the ancillary area(s), encodes the primary area according to the primary quantization parameter, encodes the ancillary area(s) according to the ancillary quantization parameter(s), and determines a coded panoramic video image.

In implementations, the area demarcation module 302 sets the primary viewing angle area as the primary area, and set the ancillary viewing angle area(s) as the ancillary area(s). Since the Pyramid model is an adaptive mapping method based on viewing angles, it is feasible to set the primary viewing angle area as the primary area and set the ancillary viewing angle area(s) as the ancillary area(s). The present embodiment can also set ancillary areas of multiple levels within the ancillary area(s) to further reduce a bit rate. In other words, the area demarcation module 302 is configured to set the primary viewing angle area as the primary area, and set the ancillary area(s) into first level ancillary area(s) to Nth level ancillary area(s), wherein the closer a distance to a vertex of a quadrangular Pyramid is, the farther a location is away from a viewing angle of a user. Therefore, ancillary area(s) of each level can be demarcated according to respective relationships with the viewing angle.

In implementations, the area demarcation module 302 is configured to determine a primary area within a primary viewing angle area based on viewing angle information, and set area(s) other than the primary area as ancillary area(s). The area demarcation module 302 is configured to set the area(s) within the primary viewing angle area that is/are different from the primary area as first level ancillary sub-area(s), and demarcate the ancillary viewing angle area of the panoramic video image into second level ancillary sub-area(s) to Nth level ancillary sub-area(s), wherein N is an integer equal to or greater than two.

The area demarcation module 302 may further demarcate a primary viewing angle area into a primary area and ancillary area(s), i.e., to select a corresponding primary area from a primary viewing angle area based on viewing angle information. The viewing angle information can be determined according to feedback information about viewing of a user. The area demarcation module 302 may then set area(s) that is/are located within the primary viewing angle area and is/are different from the primary area as the ancillary area(s), and set ancillary viewing angle area(s) as ancillary area(s). The closer a distance to a vertex of a quadrangular Pyramid is, the farther a location is away from a user's viewing angle. Therefore, ancillary area(s) of each level can be demarcated according to respective relationships with the viewing angle. Ancillary areas of multiple levels can be set up, which includes setting area(s) other than a primary area within a primary viewing angle area as first level ancillary sub-area(s), and demarcate an ancillary viewing angle area of a panoramic video image into second level ancillary sub-area(s) to Nth level ancillary sub-area(s). For example, in FIG. 6C, a slant area within a primary viewing angle area is a primary area, and other parts in the primary viewing angle area are first-level sub-areas. In ancillary viewing angle areas, A vertex common to the four ancillary viewing angle areas correspond to a vertex of a quadrangular Pyramid. Therefore, area demarcation can be implemented according to the number of high-frequency components and move from the common vertex to an opposite edge thereof. For example, G is a second level ancillary area, F is a third level ancillary area, and E is a fourth level ancillary area. Determining ancillary quantization parameters corresponding to ancillary areas includes separately determining ancillary quantization parameters of each level that correspond to ancillary areas of the respective level, assigning corresponding first level to Nth level ancillary quantization parameters to first level to Nth level ancillary areas respectively, wherein an ancillary quantization parameter is increased as a level is increased.

Another example is a spherical projection mode corresponding to an Equirectangular model.

Figure 7:
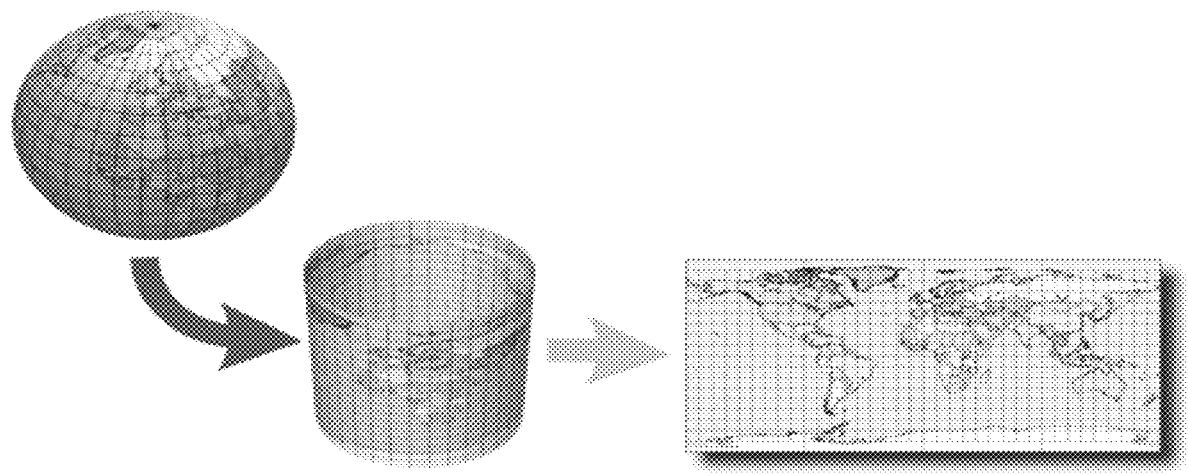
FIG. 7 is a schematic diagram illustrating an Equirectangular mapping method according to the embodiments of the present disclosure.

A panoramic video mapping corresponding to an Equirectangular model is a relatively common way of mapping. As shown in FIG. 7, an Equirectangular model can cylindrically expand an input panoramic video to get a final planar image. A difference between an Equirectangular model and a Cubemap model is that mapping and expansion of the Equirectangular model do not strictly adhere to six directions of user views. However, for a panoramic video image obtained after mapping and expansion of an Equirectangular model, a corresponding adaptive quantization window may be provided according to service needs. A primary area and ancillary area(s) can be determined through the window, which is the main area and the sub-area is determined through the window, which is determined according to a viewing angle of a user. Therefore, a value of change for respective quantization parameters inside and outside the window can be configured, i.e., decreasing a quantization parameter for the primary area and increasing quantization parameter(s) for the ancillary area(s).

The area demarcation module 302 is configured to determine a viewing angle area for a panoramic video image obtained through a Spherical mapping model, set a viewing angle area within the panoramic video image as a primary area, and set areas other than the viewing angle area as ancillary areas. The area demarcation module 302 obtains a panoramic video image determined through an Equirectangular mapping model, initially designates an area corresponding to a window as a primary area, obtains a viewing angle area (i.e., a position of the window) according to information such as user feedback during viewing, designates a viewing angle area corresponding to that position of the window as the primary area, and sets areas other than the viewing angle area as ancillary areas. The area demarcation module 302 then determines a primary quantization parameter corresponding to the primary area, and ancillary quantization parameters corresponding to the ancillary areas. The area demarcation module 302 then encodes the primary area according to the primary quantization parameter, and encodes the ancillary areas according to the ancillary quantization parameters, i.e., using an adaptive quantization coding method to process the panoramic video image to determine a coded panoramic video image. In implementations, the area demarcation module 302 is used to demarcate the areas other than the viewing angle area into first level ancillary sub-areas to Nth level ancillary sub-areas, wherein N is an integer equal or larger than two.

The quantization parameter determination module 304 is configured to determine ancillary quantization parameters of each level corresponding to ancillary area(s) of the respective level, wherein a quantization parameter is increased with a level is increased. In order to effectively reduce a compression rate, in implementations, the quantization parameter determination module 304 demarcate the ancillary area(s) into a plurality of levels of ancillary sub-areas, and thereby determine ancillary quantization parameters of the plurality of levels, increasing the quantization parameters level by level. Therefore, the area demarcation module 302 can demarcate the ancillary area(s) into ancillary sub-areas of 1st to Nth levels, wherein N is an integer equal to or larger than two. Ancillary quantization parameters of 1st to Nth levels are respectively assigned to the ancillary sub-areas of 1st to Nth levels, wherein an ancillary quantization parameter is increased as a level thereof is increased.

Figure 5B:
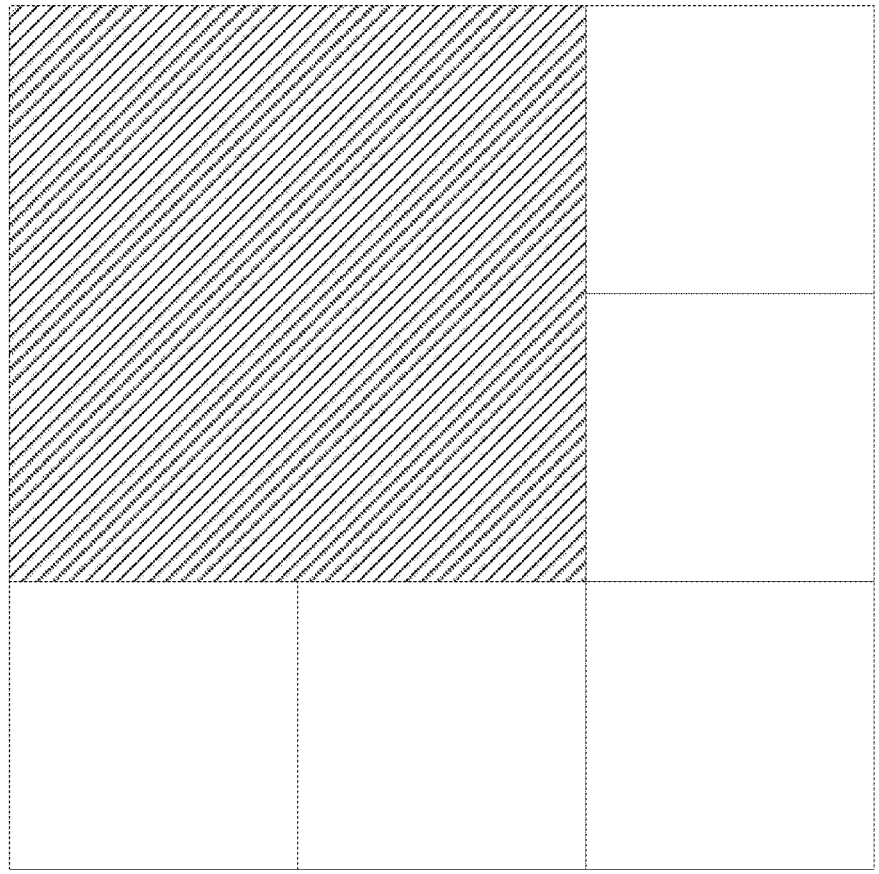

In the embodiments of the present disclosure, a mapping of Cubemap model can be adjusted to determine a Cubemap model with adaptive resolution. Correspondingly, a Cubemap mode includes a Cubemap mode with adaptive resolution. Therefore, a spherical panoramic image can be mapped based on a Cubemap mapping model with adaptive resolution. A Cubemap model with adaptive resolution can down-sample to reduce a resolution to ½ of both length and width for mapping planes other than a user viewing angle (i.e., a viewing angle) in a common Cubemap model, thereby generating a rectangular image after mapping and expansion. As such, an image shown in FIG. 5A is transformed into a panoramic video image as shown in FIG. 5B after being expanded with a Cubemap model with adaptive resolution. A rectangle that is obtained without down-sampling is the upper left corner rectangle shown in FIG. 5B and is an area corresponding to a viewing angle viewed by a user, which can be regarded as a primary area. Other remaining rectangles that are obtained by down-sampling are areas corresponding to other viewing angles, which can be demarcated as ancillary areas. The mapping module 308 includes a mapping plane determination sub-module 3082 configured to select a target mapping plane from a cube in a Cubemap mapping model and determine other mapping planes as non-target mapping planes; a mapping processing sub-module 3084 configured to map a spherical panoramic image to the target mapping plane based on a first sampling value, and map the spherical panoramic image to the non-target mapping planes based on a second sampling value, wherein the first sampling value is two times of the second sampling value; and an expansion sub-module 3086 configured to expand the mapped panoramic video image.

The mapping processing sub-module 3084 is configured to determine respective pixel positions of sampling points on a mapping plane based on a sampling value, map a spherical panoramic image according to the pixel positions, and determine pixel values of mapping positions at the spherical panoramic image. In other words, the mapping processing sub-module 3084 is configured to determine pixel positions of sampling points on a target mapping plane based on a first sampling value, map a spherical panoramic image according to the pixel positions, and determine pixel values of mapping positions at the spherical panoramic image. The mapping processing sub-module 3084 is configured to determine pixel positions of sampling points on the non-target mapping plane based on a second sampling value, map the spherical panoramic image according to the pixel positions, and determine pixel values of mapping positions at the spherical panoramic image.

Mapping planes include a target mapping plane and a non-target mapping plane, and sampling values includes a first sampling value and a second sampling value. A mapping position is an intersection point of a line (which traverses a sampling point and a center point of the spherical panoramic image) at a spherical surface thereof.

In implementations of the present disclosure, a panoramic video image that is expanded after a Cubemap model mapping with adaptive resolution may be analyzed and compared with a panoramic video image that is expanded by a Pyramid model mapping, in terms of area. FIG. 6B is used as an example. A rhombus at the center of a Pyramid is a primary viewing angle of a user. A side length of the rhombus is assumed to be 1, an area of the primary viewing angle of the user is assumed to be 1, and an entire area of an expanded Pyramid is assumed to be 2. Similarly, for FIG. 5B, an area corresponding to a primary viewing angle (a square at the upper left corner) is assumed to have a side length of 1 and an area of 1. In other words, these two models have the same pixel area and resolution at the primary viewing angle of the user, while the area of the expanded image in FIG. 5B is 1.5*1.5=2.25. In other words, the mapped and expanded area of the present disclosure is increased by 12.5% only as compared to the Pyramid mapped and expanded area. Specifically, by adopting a panoramic video mapping based on a Cubemap model with adaptive resolutions for different viewing angles, a finally mapped and expanded plane area is only 12.5% larger than that of the Pyramid model. However, the problems inherent in the Pyramid model, which include jaggedness, and a reduced compression quality in a primary viewing angle area due to the consumption of bit rate by high-frequency components in ancillary areas, etc., can be avoided.

In a practical implementation, aspects such as reducing a compression rate may further be performed. A resolution at a viewing angle of a user can also be down-sampled. For example, a square at a primary viewing angle can undergo down-sampling at a scale of ¾ of a length and a width respectively. A mapped and expanded area for the primary viewing angle becomes 6/19 of the original, and remaining five surfaces are down-sampled at the scale of ½ of a length and a width on a basis of the down-sampling at the primary viewing angle. As such, respective areas of the remaining five sides are respectively 9/64 of a normal Cubemap. Each area is down-sampled in an equal proportion, and a finally expanded image always maintains a shape as shown in FIG. 5B.

Figure 8:
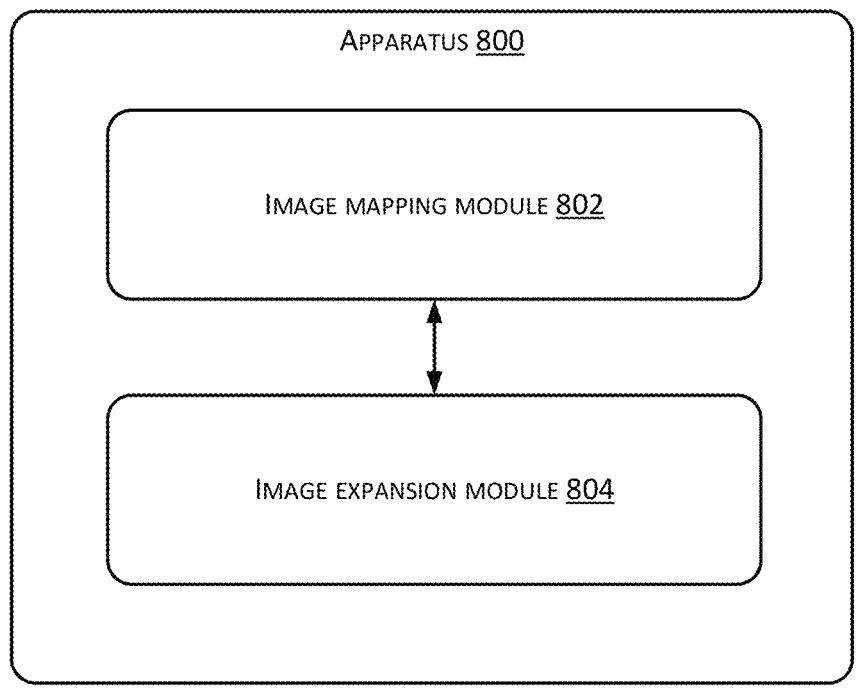
FIG. 8 is a block diagram illustrating an image mapping apparatus according to the embodiments of the present disclosure.

The embodiments of the present disclosure further provide an image mapping apparatus 800, as shown in FIG. 8, which the following modules.

An image mapping module 802 is configured to determine sampling values corresponding to a mapping plane in a Cubemap mapping model, and map a spherical panoramic image with the corresponding sampling values to obtain a mapped panoramic video image.

An image expansion module 804 is configured to expand the mapped panoramic video image.

Each image frame corresponding to a panoramic video before mapping is a spherical panoramic image. During a process of Cubemap mapping with adaptive resolution, the image mapping module 802 may determine each mapping plane and sampling values of each mapping plane from a cube corresponding to a Cubemap model, determine sampling points on each mapping plane according to the sampling values, and map the spherical panoramic image using the sampling points. The image expansion module 804 expands a mapped cube after mapping each sampling point, and thereby obtains a mapped panoramic video image. When the mapped panoramic video image is expanded, expansion can be performed according to an expansion mode corresponding to the mapping model. An expanded image shown in FIG. 5B is used as an example. A target mapping plane can be expanded to correspond to a slash area in FIG. 5B and non-target mapping planes can be expanded respectively to correspond to remaining five areas in FIG. 5B, thereby obtaining an expanded two-dimensional panoramic video image.

In implementations, the mapping planes include a target mapping place and non-target mapping plane(s), and the sampling value includes a first sampling value and a second sampling value. The image mapping module is used for selecting a target mapping plane from a cube in a Cubemap mapping model, and setting other mapping plane(s) as non-target mapping place(s); determining a first sampling value corresponding to the target mapping plane, and a second sampling value corresponding to the non-target mapping plane(s); and mapping a spherical panoramic image to the target mapping plane according to the first sampling value, and mapping the spherical panorama image to the non-target mapping plane(s) according to the second sampling value, wherein the first sampling value is two times of the second sampling value.

Each image frame corresponding to a panoramic video before mapping is a spherical panoramic image. During a process of Cubemap mapping with adaptive resolution, a mapping plane of a cube corresponding to a Cubemap model can be first set as a target mapping plane, wherein a randomly selected mapping plane of the cube, or a mapping plane that corresponds to a viewing angle and is displayed to a user can initially be set as the target mapping plane. Afterwards, a mapping plane corresponding to a viewing angle is set to be the target mapping plane based on the viewing angle adjusted by a user during a viewing process. After determining the target mapping plane, remaining five mapping places are set as non-target mapping places. Sampling points in the target mapping plane are determined according to the first sampling value for mapping the spherical panoramic image, and sampling points in the non-target mapping planes are determined according to the second sampling value for mapping the spherical panoramic image. A mapped cube that is obtained after each sampling point is mapped is expanded to determine a mapped panoramic video image. For each sampling point on a hexahedron of a Cubemap model, the respective sampling point and a center point of a panoramic video image form a straight line, and an intersection point between this line and a spherical surface is determined. The interception point is a mapping point for the respective sampling point. A one-to-one mapping relationship can be established between points on the hexahedron of the Cubemap and points on the spherical surface corresponding to a panoramic spherical video, thus implementing a mapping of a panoramic spherical video into a Cubemap hexahedron. In the present embodiment of the mapping mode with adaptive resolution, the first sampling value is two times of the second sampling value, i.e., down-sampling at a scale of ½ is performed for non-target mapping planes. Therefore, a panoramic video image as shown in FIG. 5B is obtained from an image of FIG. 5A after mapping and expansion using the Cubemap model with adaptive resolution.

The image mapping module is configured to determine pixel positions of sampling points on a mapping plane based on a sampling value, map a spherical panoramic image according to pixel positions, and determine pixel values of mapping positions at the spherical panoramic image. A mapping position is an intersection point of a line (which traverses an associated sampling point and a center point of a spherical panoramic image) at a spherical surface.

Mapping of the Cubemap model with adaptive resolution can be performed according to mapping principles of a common Cubemap. For a plane that needs to be down-sampled, a pixel position in a normal Cubemap cube corresponding to each down-sampled pixel position needs to be found and is then mapped onto a spherical model to obtain a value of this pixel. A focus on a spherical surface may not be an integer position, and so interpolation of pixels around the pixel position may be determined, and an interpolation of brightness and chroma for the pixel position may be determined. An interpolation method may be determined according to requirements. In a process of obtaining a pixel value by mapping, a smoothing filtering process may be performed to make a down-sampled mapping image smoother. For example, some pixels in a vicinity of a mapping position are obtained and are mean-weighted for filtering. Down-sampling rates of all other planes that adopt this mapping method are the same. Therefore, a corresponding processing algorithm can be specifically configured on a terminal to up-sample the texture of a down-sampled surface to an original resolution, thereby further alleviating the fuzzy and jagging effects when rendering the Cubemap model.

The above description illustrates an adaptive quantization coding method after mapping and expanding panoramic video images using examples of three-dimensional mapping models. In a practical implementation, a primary area and ancillary area(s) can be demarcated based on a selected three-dimensional mapping model and viewing angle information, and processing by level can be performed on the ancillary area(s), thereby being able to be flexibly incorporated into various types of panoramic video mapping and compression methods and frameworks.

In short, by introducing an adaptive quantization method based on a change in a viewing angle of a user in a mapping and compression framework of a panoramic video as described above, an image quality in the viewing angle of the user is enhanced while compression rates for other parts associated with viewing angle that are not viewed are reduced, thus providing the user with a better viewing experience of the panoramic video under a same compression bit rate.

The Cubemap mapping model with adaptive resolution can avoid blurring and jagging effects that are common to a Pyramid mapping model in areas distant from a viewing angle of a user, and has the best rendering performance with default rendering model support on various GPUs. At the same time, this new type of mapping method can conveniently combine adaptive quantization frameworks and effectively reduce a compression rate.

Based on the panoramic video image processing apparatus described above, an example is used to illustrate filtering for individual areas of an image.

Figure 9:
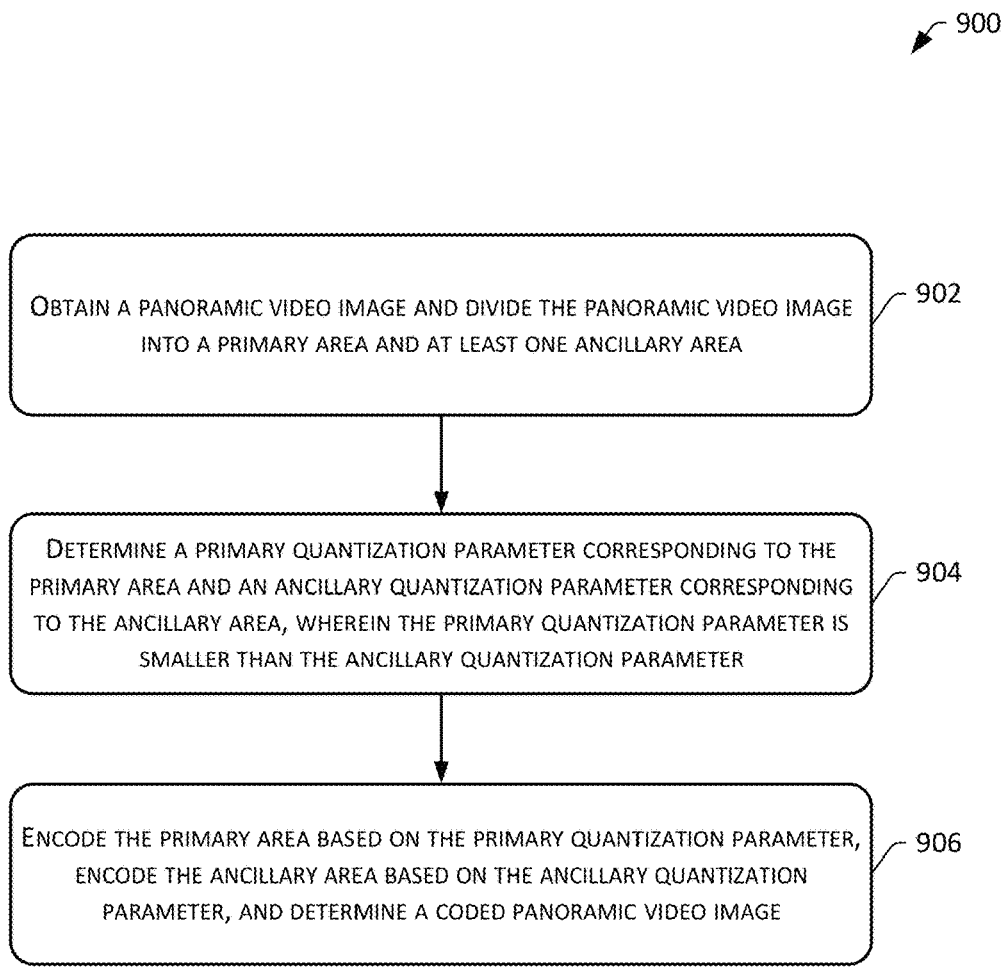
FIG. 9 is a flowchart illustrating an image processing method according to the embodiments of the present disclosure.

FIG. 9 shows a flowchart illustrating an image processing method 900 according to the embodiments of the present disclosure.

Box 902 obtains a panoramic video image and demarcates the panoramic video image into a primary area and at least one ancillary area.

Box 904 determines a primary quantization parameter corresponding to the primary area and an ancillary quantization parameter corresponding to the ancillary area, wherein the primary quantization parameter is smaller than the ancillary quantization parameter.

Box 906 encodes the primary area based on the primary quantization parameter, encodes the ancillary area based on the ancillary quantization parameter, and determines a coded panoramic video image.

An apparatus establishes a three-dimensional mapping model based on viewing angle mapping. The apparatus uses the three-dimensional mapping model to perform image mapping and obtains a panoramic video image after two-dimensional expansion. After the image is mapped and is two-dimensionally expanded, the image can also be filtered to smooth high-frequency components. Therefore, in the present embodiment, the panoramic video image that is acquired and determined by mapping may also be a mapped and filtered panoramic video image. The panoramic video has a wide scope of display, which can cover an entire viewing angle or perspective of a user. The viewing angle includes a primary viewing angle currently viewed by a user, and another viewing angle (called an ancillary viewing angle) that is not viewed by the user. Since the ancillary viewing angle is an area not viewed by the user, a waste in a compression bit rate will result if a same encoding used for the primary viewing angle is adopted. Therefore, in the embodiments of the present disclosure, quantization coding is executed based on areas distinguished by a viewing angle of a user so as to reduce a compression bit rate.

Therefore, the apparatus can determine viewing angle information based on a viewing angle of a user. The viewing angle information is used to represent information corresponding to a primary viewing angle used by the user. An image area in which the primary viewing angle of the user is located can be determined according to a mapping model. Therefore, a panoramic video image may be demarcated into a primary area, and at least one ancillary area based on viewing angle information, wherein the primary area is an area corresponding to a primary viewing angle used by a user, and the ancillary area is an area corresponding to an ancillary viewing angle and being not viewed by the user. Thus, when determining quantization parameters corresponding to different areas, the quantization parameters can be adaptively adjusted according to whether an area is being viewed or not. The apparatus can determine a primary quantization parameter corresponding to the primary area and an ancillary quantization parameter corresponding to the ancillary area. Among these areas, the primary area is an area primarily viewed by the user, and thus needs to be relatively finely quantized. The ancillary area is an area that is not viewed by the user or an area that is not at a focus of sight, and thus can be quantized relatively coarsely. In other words, the primary quantization parameter is smaller than ancillary quantization parameter. The primary area is encoded according to the primary quantization parameter, and the ancillary area is encoded according to the ancillary quantization parameter, i.e., processing the panoramic video image by using an adaptive quantization coding method, and determining a coded panoramic video image. FIG. 2 is a mapped panoramic video image (i.e., a two-dimensional planar expansion diagram). The panoramic video image can be demarcated into a primary area 10 and an ancillary area 20 after being demarcated based on the viewing angle Information. The ancillary area 20 may include three sub-areas, namely, sub-areas A, B, and C. The present embodiment adopts an adaptive quantization coding method, in which different areas may adopt different quantization parameters for encoding. Therefore, a primary quantization parameter corresponding to a primary area can be determined separately from an ancillary quantization parameter corresponding to an ancillary area. The primary quantization parameter is smaller than the ancillary quantization parameter. Therefore, in implementations, the primary area is encoded based on the primary quantization parameter, and the ancillary area is encoded based on the ancillary quantization parameter. In other words, a coded panoramic video image can be obtained by processing a panoramic video image using an adaptive quantization coding method, and can then be transmitted to a user end for decoding, mapping, rendering, and presentation.

In short, a mapped panoramic video image that is determined to be mapped is obtained. The panoramic video image is demarcated into a primary area and at least one ancillary area based on viewing angle information. Different quantization parameters are assigned for different areas, i.e., setting a primary quantization parameter corresponding to the primary area, and setting an ancillary quantization parameter corresponding to the ancillary area, with the primary quantization parameter being smaller than the ancillary quantization parameter. The primary region is encoded based on the primary quantization parameter, and the ancillary area is encoded based on ancillary quantization parameter to determine a coded panoramic video image. A bit rate is effectively reduced using an adaptive coding. Meanwhile, a relatively small primary quantization parameter is used in encoding of the primary area corresponding to a user viewing angle, in order to guarantee a sufficient resolution for the primary area and to ensure a normal viewing of a video by a user.

The embodiments of the present disclosure may be applied to panoramic video images that are expanded and mapped by various three-dimensional mapping models. Different three-dimensional mapping models correspond to different mapping modes. In the present embodiment, a three-dimensional mapping model includes at least one of a Cubemap model, a Pyramid model, an equirectangular model, and may also include other three-dimensional mapping models, which are not exhaustively listed in the present disclosure and should not be construed as limiting the embodiments of the present disclosure. Corresponding mapping modes include at least one of a Cubemap mapping mode corresponding to the Cubemap model, a Pyramid mapping mode corresponding to the Pyramid model, a Spherical mapping mode corresponding to the equirectangular model, and mapping modes corresponding to other three-dimensional mapping models.

In implementations, demarcating the panoramic video image into the primary area and the at least one ancillary area includes determining viewing angle information according to a mapping model, demarcating a panoramic video image according to the viewing angle information, and determining a primary area and at least one ancillary area. Based on a mapping method of the three-dimensional mapping model, the area demarcation module 302 can determine viewing angle information of a primary viewing angle of a user. For example, when multi-path video images are mapped, a viewing angle can be ascertained based on which path a user is watching. In another example, based on a three-dimensional mapping model corresponding to a mapping mode, a corresponding viewing range of a primary viewing angle a user views at can be determined. In turn, a panoramic video image is demarcated into a primary area and at least one ancillary area using information of the viewing angle.

Since a panoramic video can be mapped by using a variety of three-dimensional mapping models, and different mapping modes may adopt different ways to determine a primary and ancillary area(s), the present embodiment uses a plurality of mapping modes as examples to describe an adaptive quantization coding of a panoramic video image.

In implementations, a Cubemap mapping mode corresponding to a Cubemap model is used.

A Cubemap model maps a spherical panoramic video image to a hexahedron and expands the hexahedron to a two-dimensional image. For each point on a hexagon of the Cubemap model, when the respective point is connected with the center of the panoramic video image, a point of intersection can be found on a spherical surface. As a result, through a line going through the point of intersection and the center of the panoramic video image, a one-to-one mapping relationship can be established between points on the spherical surface corresponding to the Cubemap hexahedron and points on the panoramic spherical video. Mapping a panoramic spherical video into a Cubemap hexahedron can thus be realized. After the Cubemap hexahedron has been mapped, six faces of a cube can be expanded into a flat image. An example of a panoramic video image that is mapped after a two-dimensional plane expansion is shown in FIG. 5A. The panoramic video image includes six expanded rectangles respectively corresponding to image data of upper, lower, left, right, front and back of a hexahedron.

Since the six sides of the two-dimensionally expanded panoramic video image in Cubemap correspond to a viewing angle of a user in six directions respectively, in one example, encoding quantization can be adaptively performed according to six views of the user from top, bottom, left, right, front, and back. Apparently, in practical applications, the number of views of a Cubemap corresponding to a panoramic video image may be set as required, which is not limited in the embodiments of the present disclosure.

After Cubemap mapping and expansion, the 360° panoramic video image is gone through adaptive quantization processing according to a viewing angle of the user. A six-way adaptive quantization processing for six viewing angles of a user as described above is used as an example. One out of the six viewing angles is a viewing angle used by the user. As shown in FIG. 5A, a viewing angle in the upper left corner is taken as the viewing angle of the user. A quantization parameter of an area corresponding to this viewing angle used by the user can be reduced, and quantization parameters of areas corresponding to the other viewing angles can be increased, so that the quantization parameters corresponding to the other view angles are higher than the corresponding quantization parameter of the viewing angle used by the user. As a result, the user can watch an image of a higher compression quality from this viewing angle, whereas compression bit rates in the remaining parts of the image are reduced due to higher quantization parameters. Therefore, the method maintains a high clarity in a viewing angle used by a user and reduces compression bit rates for the remaining video areas.

The above method is implemented for M viewing angles of a user (such as viewing angles corresponding to upper, lower, left, right, front, and back six angles of the user as shown in FIG. 5A) respectively to perform transcoding of adaptive quantization. Six-channel adaptive quantization video encoding streams are obtained at the transcoding end. When a user of the terminal began to watch, it is possible to timely switch, based on a change in a viewing angle of the user, to an adaptive quantization stream with reduced quantization parameters that correspond to a primary viewing angle where the user is watching. As a result, the user can always get a high-quality viewing experience.

Therefore, a process of encoding corresponding to mapping and expansion of an image by a Cubemap model may include the following.

Figure 10:
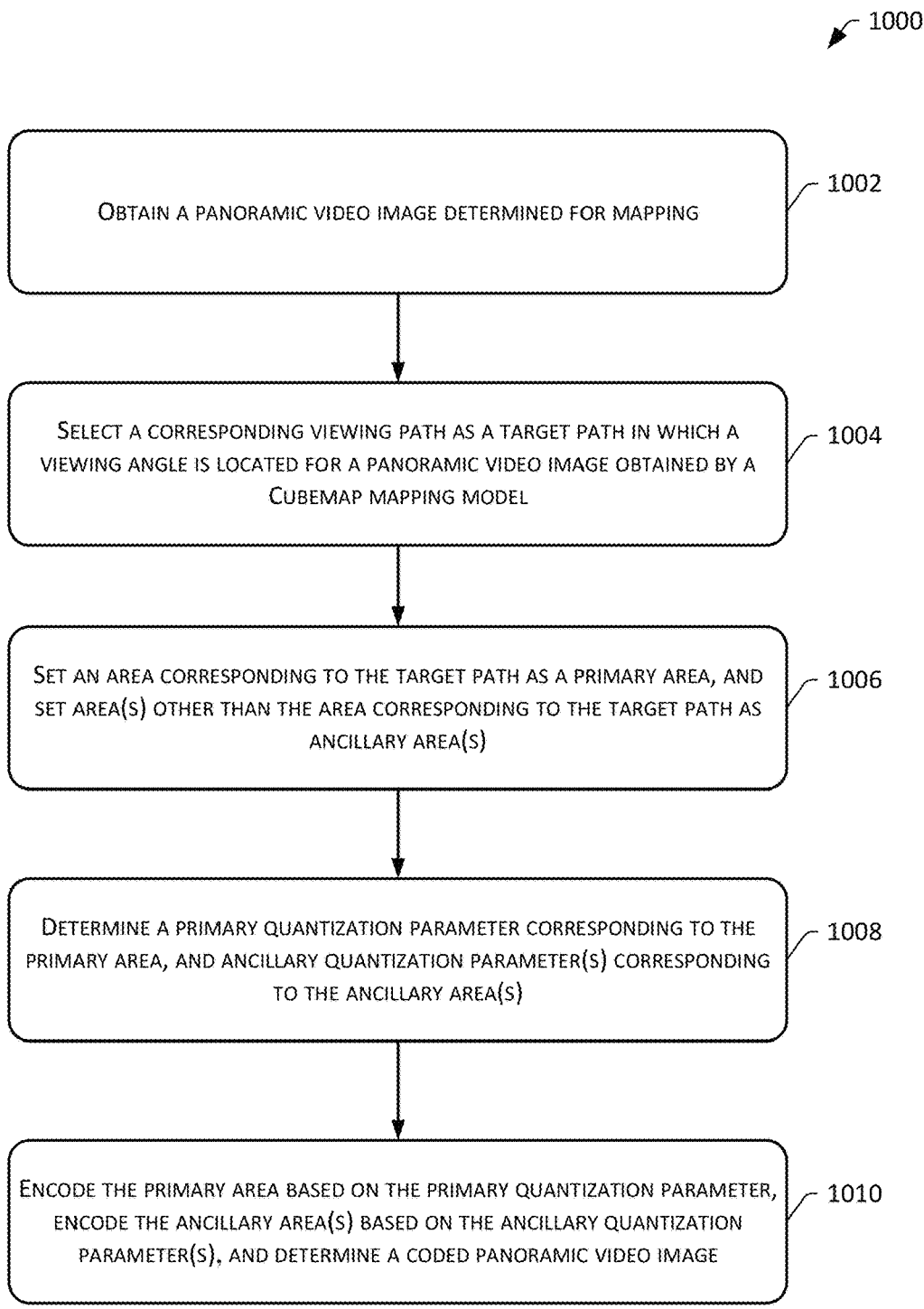
FIG. 10 is a flowchart illustrating an adaptive quantization coding method based on Cubemap mapping according to the embodiments of the present disclosure.

FIG. 10 is a flowchart illustrating an adaptive quantization coding method 1000 based on a Cubemap mapping according to the embodiments of the present disclosure.

Block 1002 obtains a panoramic video image determined for mapping.

Block 1004 selects a corresponding viewing path as a target path in which a viewing angle is located for a panoramic video image obtained by a Cubemap mapping method.

Block 1006 sets an area corresponding to the target path as a primary area, and sets area(s) other than the area corresponding to the target path as ancillary area(s).

Block 1008 determines a primary quantization parameter corresponding to the primary area, and ancillary quantization parameter(s) corresponding to the ancillary area(s).

Block 1010 encodes the primary area based on the primary quantization parameter, encodes the ancillary area(s)

based on the ancillary quantization parameter(s), and determines a coded panoramic video image.

The apparatus obtains a panoramic video image determined by a Cubemap mapping model, determines M viewing angles for the image, with each viewing angle corresponding to one channel of a video stream. A path may initially be selected to be a target path, and a path corresponding to what a user is watching (i.e., a corresponding viewing path) is then adjusted during a video transmission process and the path is set to be a target path of a viewing angle where the viewing angle is located. An area corresponding to the target path of viewing angle is set to be primary area, and other area(s) corresponding to other path(s) located outside the target path is/are set as ancillary area(s). As shown in FIG. 5A, an area at the upper left corner is set to be a primary area, and other areas are set to be ancillary areas. A primary quantization parameter corresponding to the primary area is determined, and respective ancillary quantization parameters corresponding to the ancillary areas are determined. The primary area is encoded according to the primary quantization parameter, and encodes the ancillary areas are encoded according to the respective ancillary quantization parameters, thus processing the panoramic video image using an adaptive quantization coding scheme, and determining a coded panoramic video image.

In implementations, setting the area corresponding to the target path as the primary area, and setting the area(s) other than the area corresponding to the target path as the ancillary area(s) include the following operations.

S1 selects a sub-area within the corresponding area of the target path to be the primary area, and sets sub-area(s) in the corresponding area of the target path other than the primary area as first level ancillary area(s).

S2 demarcate area(s) of path(s) other than the target-path into second level ancillary sub-area(s) to Nth level ancillary area(s), wherein N is an integer equal or larger than two.

Determining the ancillary quantization parameter(s) corresponding to the ancillary area(s) includes the following operation.

S3, separately determines ancillary quantization parameters of different levels corresponding to ancillary sub-areas of different levels, wherein an ancillary quantization parameter is increased as a level thereof is increased.

In the embodiments of the present disclosure, in order to effectively reduce a compression rate, an ancillary area can be demarcated into a plurality of different levels of ancillary areas, so as to determine ancillary quantization parameters of multiple levels and increase the quantization parameters level by level. Therefore, the ancillary area(s) can be demarcated into first level to Nth level ancillary areas, wherein N is an integer equal to or larger than two. The area demarcation module 302 can also select a sub-area within an area corresponding to the target path to be the primary area, set sub-area(s) of the corresponding area of the target path other than the primary area as first level ancillary area(s), and demarcate area(s) corresponding to path(s) other than the target path into second level ancillary area(s) to Nth level ancillary area(s). First level to Nth level ancillary quantization parameters are respectively assigned to the first level ancillary area(s) to the Nth level ancillary area(s), wherein a value of an ancillary quantization parameter increases as a level thereof increases. An area corresponding to a viewing angle opposite to the viewing angle viewed by the user can be set to be the Nth level ancillary area(s). For example, FIG. 5A has six viewing angles including the top, bottom, left, right, front, back, and front as described above. If a shaded area in the upper left corner is a front corresponding viewing angle, an area corresponding to a back corresponding viewing angle can be set to be a Nth level ancillary area, thus processing the adaptive quantization coding according to a viewing angle viewed by a user and reducing a bit rate.

In the embodiments of the present disclosure, a mapping of Cubemap model can be adjusted to determine a Cubemap model with adaptive resolution. Correspondingly, a Cubemap mode includes a Cubemap mode with adaptive resolution. Therefore, a spherical panoramic image can be mapped based on a Cubemap mapping model with adaptive resolution, which includes: obtaining a spherical panoramic image; separately determining sampling values corresponding to mapping planes in a Cubemap mapping model, and mapping the spherical panoramic image with corresponding sampling values; and expanding the mapped panoramic video image. Each image frame corresponding to a panoramic video before mapping is a spherical panoramic image. During a process of Cubemap mapping with adaptive resolution is performed, each mapping plane and sampling values of each mapping plane can be determined from a cube corresponding to a Cubemap model. Sampling points on each mapping plane are then determined according to the sampling values, and the spherical panoramic image is mapped using the sampling points. A mapped cube is expanded after mapping each sampling point, and a mapped panoramic video image is determined.

A Cubemap model with adaptive resolution can downsample to reduce a resolution to ½ of both length and width for mapping planes other than a user viewing angle (i.e., a viewing angle) in a common Cubemap model, thereby generating a rectangular image after mapping and expansion. As such, an image shown in FIG. 5A is transformed into a panoramic video image as shown in FIG. 5B after being expanded with a Cubemap model with adaptive resolution. A rectangle that is obtained without down-sampling is the upper left corner rectangle shown in FIG. 5B and is an area corresponding to a viewing angle viewed by a user, which can be regarded as a primary area. Other remaining rectangles that are obtained by down-sampling are areas corresponding to other viewing angles, which can be demarcated as ancillary areas.

Figure 5C:
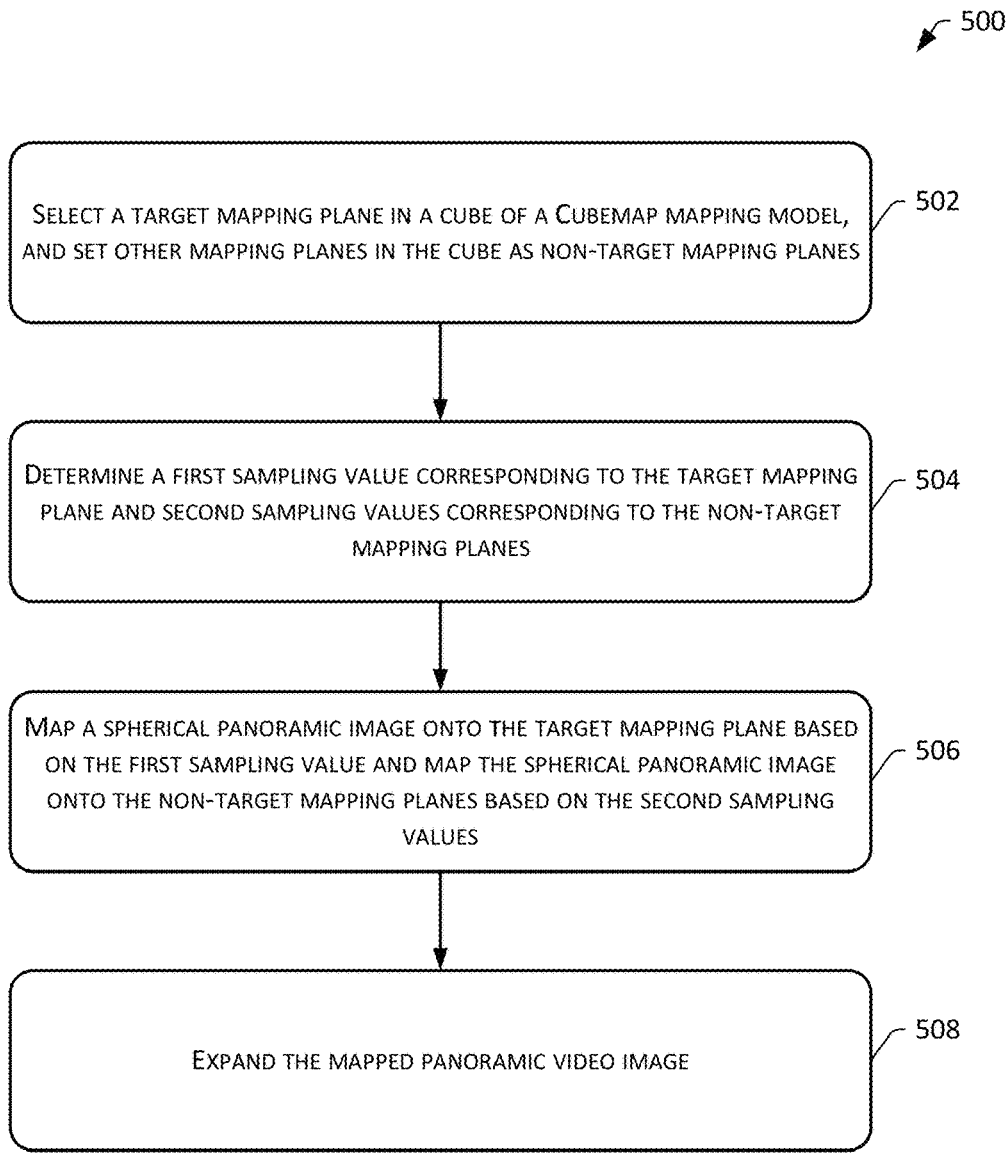

A mapping process of a method 500 of mapping a spherical panoramic image based on a Cubemap mapping model with adaptive resolution is shown in FIG. 5C.

Box 502 selects a target mapping plane in a cube of a Cubemap mapping model, and sets other mapping planes in the cube as non-target mapping planes.

Box 504 determines a first sampling value corresponding to the target mapping plane and second sampling values corresponding to the non-target mapping planes.

Box 506 maps a spherical panoramic image onto the target mapping plane based on the first sampling value and maps the spherical panoramic image onto the non-target mapping planes based on the second sampling values.

Box 508 expands the mapped panoramic video image.

Each image frame corresponding to a panoramic video before mapping is a spherical panoramic image. During a process of Cubemap mapping with adaptive resolution, a mapping plane of a cube corresponding to a Cubemap model can be first set as a target mapping plane, wherein a randomly selected mapping plane of the cube, or a mapping plane that corresponds to a viewing angle and is displayed to a user can initially be set as the target mapping plane. Afterwards, a mapping plane corresponding to a viewing angle is set to be the target mapping plane based on the viewing angle adjusted by a user during a viewing process.

After determining the target mapping plane, remaining five mapping places are set as non-target mapping places. Sampling points in the target mapping plane are determined according to the first sampling value for mapping the spherical panoramic image, and sampling points in the non-target mapping planes are determined according to the second sampling value for mapping the spherical panoramic image. A mapped cube that is obtained after each sampling point is mapped is expanded to determine a mapped panoramic video image. For each sampling point on a hexahedron of a Cubemap model, the respective sampling point and a center point of a panoramic video image form a straight line, and an intersection point between this line and a spherical surface is determined. The interception point is a mapping point for the respective sampling point. A one-to-one mapping relationship can be established between points on the hexahedron of the Cubemap and points on the spherical surface corresponding to a panoramic spherical video, thus implementing a mapping of a panoramic spherical video into a Cubemap hexahedron. In the present embodiment of the mapping mode with adaptive resolution, the first sampling value is two times of the second sampling value, i.e., down-sampling at a scale of ½ is performed for non-target mapping planes. When the mapped panoramic video image is expanded, expansion can be performed according to an expansion mode corresponding to the mapping model. An expanded image shown in FIG. 5B is used as an example. A target mapping plane can be expanded to correspond to a slash area in FIG. 5B and non-target mapping planes can be expanded respectively to correspond to remaining five areas in FIG. 5B, thereby obtaining an expanded two-dimensional panoramic video image.

Mapping the spherical panoramic image onto the target mapping plane based on the first sampling value includes: determining pixel positions of sampling points on the target mapping plane based on a first sampling value, mapping the spherical panoramic image according to the pixel positions, and determining pixel values of mapping positions at the spherical panoramic image. Mapping the spherical panoramic image onto the non-target mapping plane based on the second sampling value includes: determining pixel positions of sampling points on the non-target mapping plane based on a second sampling value, mapping the spherical panoramic image according to the pixel positions, and determining pixel values of mapping positions at the spherical panoramic image. A mapping position is an intersection point of a line (which traverses a sampling point and a center point of the spherical panoramic image) at a spherical surface thereof.

Mapping of the Cubemap model with adaptive resolution can be performed according to mapping principles of a common Cubemap. For a plane that needs to be down-sampled, a pixel position in a normal Cubemap cube corresponding to each down-sampled pixel position needs to be found and is then mapped onto a spherical model to obtain a value of this pixel. A focus on a spherical surface may not be an integer position, and so interpolation of pixels around the pixel position may be determined, and an interpolation of brightness and chroma for the pixel position may be determined. An interpolation method may be determined according to requirements. In a process of obtaining a pixel value by mapping, a smoothing filtering process may be performed to make a down-sampled mapping image smoother. For example, some pixels in a vicinity of a mapping position are obtained and are mean-weighted for filtering. Down-sampling rates of all other planes that adopt this mapping method are the same. Therefore, a corresponding processing algorithm can be specifically configured on a terminal to up-sample the texture of a down-sampled surface to an original resolution, thereby further alleviating the fuzzy and jagging effects when rendering the Cubemap model.

Another example is a Pyramid mapping mode corresponding to a Pyramid model.

The Pyramid model can map a panoramic video to multi-channel VR videos based on different viewing angles of a user, thus lowering a resolution and a transmission bit rate of each VR video. In this technical framework, high-resolution image data can be presented to the user at a primary viewing angle viewed by the user, and low-resolution image data can be displayed in an area distant from the primary viewing angle of the user. As a result, the model enables the user to view high definition content at the primary viewing angle while keeping an overall compression image area and a bit rate of the panoramic video at a relatively low level.

First, an input VR panoramic video is decoded and fed into multiple parallel multi-viewing angle mapping modules. The mapping modules generate multi-channel VR panoramic videos with different resolutions at different viewing angles through a mapping algorithm, based on an original input VR video from different viewing angles. The generated multi-channel panoramic videos are sent to a VR panoramic video encoding module for encoding and output. An encoded output stream is sent to a module that slices and packages the stream, and this module outputs the stream after slicing and packaging based on a transport layer protocol such as HLS. When viewed by a user of a terminal, the terminal promptly downloads a video stream in response to a change in a viewing angle of the user, so that the user can obtain a high-definition viewing experience in every viewing angle.

A mapping mode corresponding to the Pyramid model has already performed mapping according to a change in a viewing angle of a user. FIG. 6A shows a schematic diagram illustrating underlying principles of a Pyramid mapping method according to the embodiments of the present disclosure. Therefore, an image corresponding to a primary viewing angle viewed by a user has a higher resolution, and images of other viewing angles have a lower resolution. A vertex of a rectangular pyramid in the Pyramid mapping model represents a location that is the farthest from a viewing angle viewed by the user. A variety of panorama video images can be obtained after mapping and expansion of the Pyramid mapping model. An example of a panoramic video image is shown in FIG. 6B. A rhombus area surrounded by four triangular areas in the image is a primary viewing angle area 10, and the triangular areas are ancillary viewing angle areas. In other words, the panoramic video image includes one primary viewing angle area 10 and four ancillary viewing angle areas (i.e., 20-50). Another example of a panoramic video image is shown in FIG. 6C, which includes a primary viewing angle area 11 and ancillary viewing angle areas 21-51. A vertex common to the ancillary viewing angle areas may be a vertex where an area having the highest high-frequency component is located. Therefore, an example of this type of expansion may also combine these four ancillary viewing angle areas into one ancillary viewing angle area.

The embodiments of the present disclosure relate to an adaptive quantization coding based on a change in a viewing angle of a user. The adaptive quantization coding may be performed after Pyramid mapping which is also based on the change in the viewing angle of the user, i.e., providing an adaptive quantization algorithm for each Pyramid mapping result of each viewing angle. A primary area may be determined according to a primary viewing angle that is determined through mapping. For example, a primary viewing angle area can be set to be a primary area, or a primary area corresponding to a viewing angle may be further demarcated from the primary viewing angle area, as shown in slanted areas of FIG. 6B and FIG. 6C. Specifically, a primary area determined in a primary viewing angle area is determined according to an actual viewing angle of a user. For example, adaptive quantization coding can be implemented through real-time adjustment according to a feedback of a video stream. An ancillary viewing angle area is determined as an ancillary area. If only a part of a primary viewing angle area is a primary area, remaining areas in the primary viewing angle area are also demarcated as ancillary areas. For example, areas other than slashed areas in FIGS. 6B and 6C are ancillary areas. A quantization parameter QP of a primary area is reduced, while a quantization parameter of an ancillary area is increased in quantization coding. Therefore, when a user is viewing at a viewing angle towards a slanted line region, an image with a higher compression quality can be seen, and bit rates of compression for remaining parts of the image are further reduced due to higher quantization parameters, thereby improving a viewing resolution of a primary viewing angle of the user by the Pyramid mapping, while reducing compression rates of other parts of an entire video. As such, a distribution of compression rates tends to have a viewing quality increased within the primary viewing angle of the user. In this way, an adaptive quantization algorithm can be further superimposed on a panoramic video coding on a basis of a resolution mapping that is adaptive to the perspective of a user, thus putting concentration of a coded bit rate towards a viewing angle of the user. Based on an adaptive resolution, an image quality within the viewing angle of the user is further enhanced in the compression module.

Therefore, a process of encoding corresponding to mapping and expansion of an image by a Pyramid model may include the following.

Figure 11:
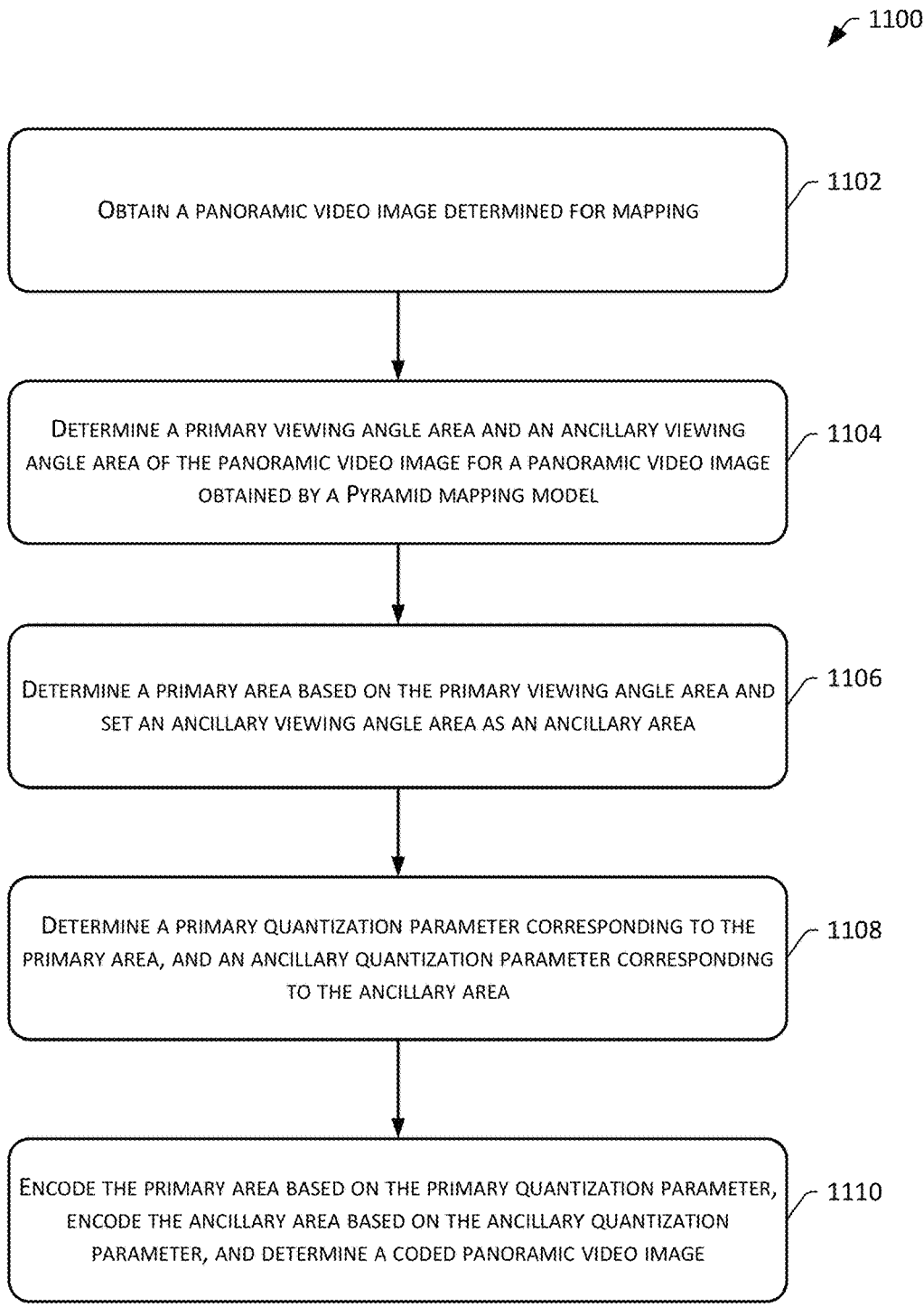
FIG. 11 is a flowchart illustrating an adaptive quantization coding method based on Pyramid mapping according to the embodiments of the present disclosure.

FIG. 11 is a flowchart illustrating a filtering method based on a Pyramid model according to another embodiment of the present disclosure.

Block 1102 obtains a panoramic video image determined for mapping.

Block 1104 determines a primary viewing angle area and an ancillary viewing angle area of the panoramic video image for a panoramic video image obtained by a Pyramid mapping model.

Block 1106 determines a primary area based on the primary viewing angle area and sets an ancillary viewing angle area as an ancillary area.

Block 1108 determines a primary quantization parameter corresponding to the primary area, and an ancillary quantization parameter corresponding to the ancillary area.

Block 1110 encodes the primary area based on the primary quantization parameter, encodes the ancillary area based on the ancillary quantization parameter, and determines a coded panoramic video image.

The apparatus obtains a panoramic video image determined by a Pyramid mapping model. The panoramic video image includes both a primary viewing angle area and ancillary viewing angle area(s). The apparatus determines a primary area based on the primary viewing angle area, and sets the ancillary viewing angle area(s) to be ancillary area(s). Furthermore, the apparatus reduces a quantization parameter corresponding to the primary area increases ancillary quantization parameter(s) corresponding to the ancillary area(s), encodes the primary area according to the primary quantization parameter, encodes the ancillary area(s) according to the ancillary quantization parameter(s), and determines a coded panoramic video image.

In implementations, determining the primary area based on the primary viewing angle area, and setting the ancillary viewing angle area(s) as the ancillary area(s) include the following operations.

S4 sets the primary viewing angle area as the primary area, and set the ancillary viewing angle area(s) as the ancillary area(s). Since the Pyramid model is an adaptive mapping method based on viewing angles, it is feasible to set the primary viewing angle area as the primary area and set the ancillary viewing angle area(s) as the ancillary area(s). The present embodiment can also set ancillary areas of multiple levels within the ancillary area(s) to further reduce a bit rate. In other words, setting the ancillary viewing angle area(s) as the ancillary area(s) includes setting the primary viewing angle area as the primary area, and setting the ancillary area(s) into first level ancillary area(s) to Nth level ancillary area(s), wherein N is greater than or equal to an integer of two. The closer a distance to a vertex of a quadrangular Pyramid is, the farther a location is away from a viewing angle of a user. Therefore, ancillary area(s) of each level can be demarcated according to respective relationships with the viewing angle.

In implementations, determining the primary area based on the primary viewing angle area, and setting the ancillary viewing angle area(s) as the ancillary area(s) include the following operations.

S5, further selects a primary area corresponding to viewing angle information within a primary viewing angle area, set area(s) other than the primary area as ancillary area(s), and set the ancillary viewing angle area(s) as the ancillary area(s). A primary viewing angle area can be further demarcated into a primary area and ancillary area(s), i.e., selecting a primary area corresponding to viewing angle information from a primary viewing angle area. The viewing angle information can be determined according to feedback information about viewing of a user. The area demarcation module 302 may then set area(s) that is/are located within the primary viewing angle area and is/are different from the primary area as the ancillary area(s), and set ancillary viewing angle area(s) as ancillary area(s). The closer a distance to a vertex of a quadrangular Pyramid is, the farther a location is away from a user's viewing angle. Therefore, ancillary area(s) of each level can be demarcated according to respective relationships with the viewing angle. Ancillary areas of multiple levels can be set up, which includes setting area(s) other than a primary area within a primary viewing angle area as first level ancillary sub-area(s), and demarcate an ancillary viewing angle area of a panoramic video image into second level ancillary sub-area(s) to Nth level ancillary sub-area(s). For example, in FIG. 6C, a slant area within a primary viewing angle area is a primary area, and other parts in the primary viewing angle area are first-level sub-areas. In ancillary viewing angle areas, A vertex common to the four ancillary viewing angle areas correspond to a vertex of a quadrangular Pyramid. Therefore, area demarcation can be implemented according to the number of high-frequency components and move from the common vertex to an opposite edge thereof. For example, G is a second level ancillary area, F is a third level ancillary area, and E is a fourth level ancillary area. Determining ancillary quantization parameters corresponding to ancillary areas includes separately determining ancillary quantization parameters of each level that correspond to ancillary areas of the respective level, assigning corresponding first level to Nth level ancillary quantization parameters to first level to Nth level ancillary areas respectively, wherein an ancillary quantization parameter is increased as a level is increased.

In implementations of the present disclosure, a panoramic video image that is expanded after a Cubemap model mapping with adaptive resolution may be analyzed and compared with a panoramic video image that is expanded by a Pyramid model mapping, in terms of area.

FIG. 6B is used as an example. A rhombus at the center of a Pyramid is a primary viewing angle of a user. A side length of the rhombus is assumed to be 1, an area of the primary viewing angle of the user is assumed to be 1, and an entire area of an expanded Pyramid is assumed to be 2. Similarly, for FIG. 5B, an area corresponding to a primary viewing angle (a square at the upper left corner) is assumed to have a side length of 1 and an area of 1. In other words, these two models have the same pixel area and resolution at the primary viewing angle of the user, while the area of the expanded image in FIG. 5B is 1.5*1.5=2.25. In other words, the mapped and expanded area of the present disclosure is increased by 12.5% only as compared to the Pyramid mapped and expanded area. Specifically, by adopting a panoramic video mapping based on a Cubemap model with adaptive resolutions for different viewing angles, a finally mapped and expanded plane area is only 12.5% larger than that of the Pyramid model. However, the problems which include jaggedness and a reduced compression quality in a primary viewing angle area that are inherent in a Pyramid model, due to the consumption of bit rate by high-frequency components in ancillary areas, etc., can be avoided.

In a practical implementation, aspects such as reducing a compression rate may further be performed. A resolution at a viewing angle of a user can also be down-sampled. For example, a square at a primary viewing angle can undergo down-sampling at a scale of ¾ of a length and a width respectively. A mapped and expanded area for the primary viewing angle becomes 6/19 of the original, and remaining five surfaces are down-sampled at the scale of ½ of a length and a width on a basis of the down-sampling at the primary viewing angle. As such, respective areas of the remaining five sides are respectively 9/64 of a normal Cubemap. Each area is down-sampled in an equal proportion, and a finally expanded image always maintains a shape as shown in FIG. 5B.

Another example is a spherical projection mode corresponding to an Equirectangular model.

The Equirectangular model corresponding to the panoramic video mapping is a relatively common way to map, as shown in FIG. 7, the Equirectangular model can take an input panoramic video and expand it cylindrically to get a final plane image.

A difference between an Equirectangular model and a Cubemap model is that mapping and expansion of the Equirectangular model do not strictly adhere to six directions of user views. However, for a panoramic video image obtained after mapping and expansion of an Equirectangular model, a corresponding adaptive quantization window may be provided according to service needs. A primary area and ancillary area(s) can be determined through the window, which is the main area and the sub-area is determined through the window, which is determined according to a viewing angle of a user. Therefore, a value of change for respective quantization parameters inside and outside the window can be configured, i.e., decreasing a quantization parameter for the primary area and increasing quantization parameter(s) for the ancillary area(s).

Therefore, a process of encoding corresponding to mapping and expansion of an image by an Equirectangular model may include the following.

Figure 12:
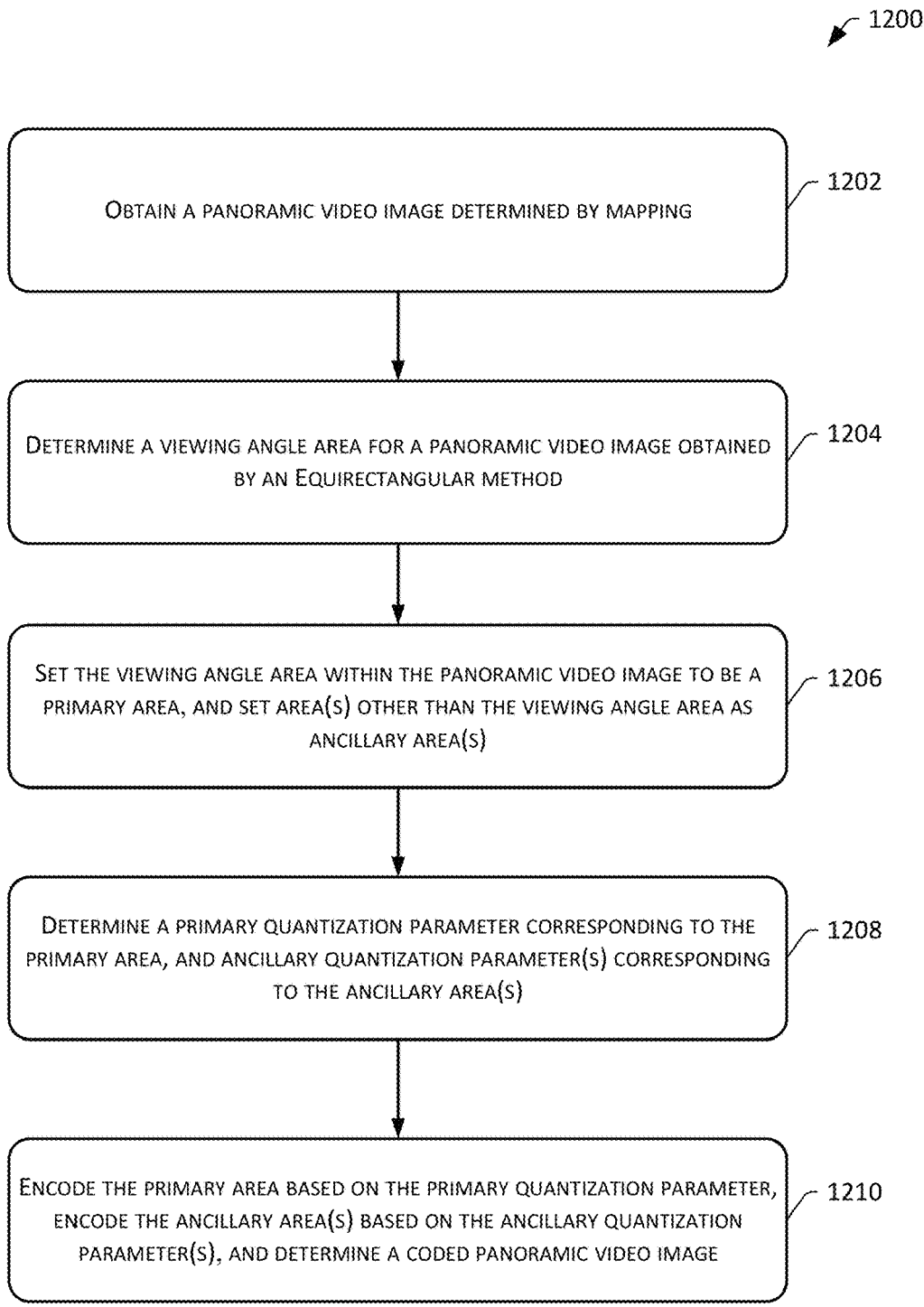
FIG. 12 is a flowchart illustrating an adaptive quantization coding method based on Equirectangular mapping according to the embodiments of the present disclosure.

FIG. 12 is a flowchart illustrating a filtering method based on an Equirectangular mapping according to another embodiment of the present disclosure.

Block 1202 obtains a panoramic video image determined by mapping.

Block 1204 determines a viewing angle area for a panoramic video image obtained by an Equirectangular method.

Block 1206 sets the viewing angle area within the panoramic video image to be a primary area, and sets area(s) other than the viewing angle area as ancillary area(s).

Block 1208 determines a primary quantization parameter corresponding to the primary area, and ancillary quantization parameter(s) corresponding to the ancillary area(s).

Block 1210 encodes the primary area based on the primary quantization parameter, encodes the ancillary area(s) based on the ancillary quantization parameter(s), and determines a coded panoramic video image.

An apparatus obtains a panoramic video image determined through an Equirectangular mapping model, initially designates an area corresponding to a window as a primary area, obtains a viewing angle area (i.e., a position of the window) according to information such as user feedback during viewing, designates a viewing angle area corresponding to that position of the window as the primary area, and sets areas other than the viewing angle area as ancillary areas. The area demarcation module 302 then determines a primary quantization parameter corresponding to the primary area, and ancillary quantization parameters corresponding to the ancillary areas. The area demarcation module 302 then encodes the primary area according to the primary quantization parameter, and encodes the ancillary areas according to the ancillary quantization parameters, i.e., using an adaptive quantization coding method to process the panoramic video image to determine a coded panoramic video image.

In implementations, setting the area(s) other than the viewing angle area as the ancillary area(s) including demarcating the area(s) other than the viewing angle area into first level ancillary sub-area(s) to Nth level ancillary sub-area(s), wherein N is an integer equal or larger than two. In addition, determining the ancillary quantization parameter(s) corresponding to the ancillary area(s) includes separately determining ancillary quantization parameters of each level corresponding to ancillary area(s) of the respective level, wherein a quantization parameter is increased with a level is increased. In order to effectively reduce a compression rate, in implementations, the ancillary area(s) can be demarcated into a plurality of levels of ancillary sub-areas, and thereby ancillary quantization parameters of the plurality of levels can be determined, with a quantization parameter being increased level by level. Therefore, the ancillary area(s) can be demarcated into ancillary sub-areas of 1st to Nth levels, wherein N is an integer equal to or larger than two. Ancillary quantization parameters of 1st to Nth levels are respectively assigned to the ancillary sub-areas of 1st to Nth levels, wherein an ancillary quantization parameter is increased as a level thereof is increased.

The above description illustrates an adaptive quantization coding method after mapping and expanding panoramic video images using examples of three-dimensional mapping models. In a practical implementation, a primary area and ancillary area(s) can be demarcated based on a selected three-dimensional mapping model and viewing angle information, and processing by level can be performed on the ancillary area(s), thereby being able to be flexibly incorporated into various types of panoramic video mapping and compression methods and frameworks.

In short, by introducing an adaptive quantization method based on a change in a viewing angle of a user in a mapping and compression framework of a panoramic video as described above, an image quality in the viewing angle of the user is enhanced while compression rates for other parts associated with viewing angle that are not viewed are reduced, thus providing the user with a better viewing experience of the panoramic video under a same compression bit rate.

The Cubemap mapping model with adaptive resolution can avoid blurring and jagging effects that are common to a Pyramid mapping model in areas distant from a viewing angle of a user, and has the best rendering performance with default rendering model support on various GPUs. At the same time, this new type of mapping method can conveniently combine adaptive quantization frameworks and effectively reduce a compression rate.

In the embodiments of the present disclosure, a user terminal refers to a terminal device having a multimedia function and supporting audio, video, data, and other functions. In implementations, the user terminal may include a smart mobile terminal such as a smartphone, a tablet computer, a smart wearable device, a VR device, or the like.

It should be noted that the method embodiments are expressed as a series of combination of actions for the sake of description. One skilled in the art, however, should be aware that the embodiments of the present disclosure are not limited by the described sequences of actions, because some operations may be taken in other order or in parallel according to the embodiments of the present disclosure. Furthermore, one skilled in the art should also be aware that the embodiments described in the specification are exemplary embodiments, and actions involved therein may not be essential for the embodiments of this application.

Figure 13:
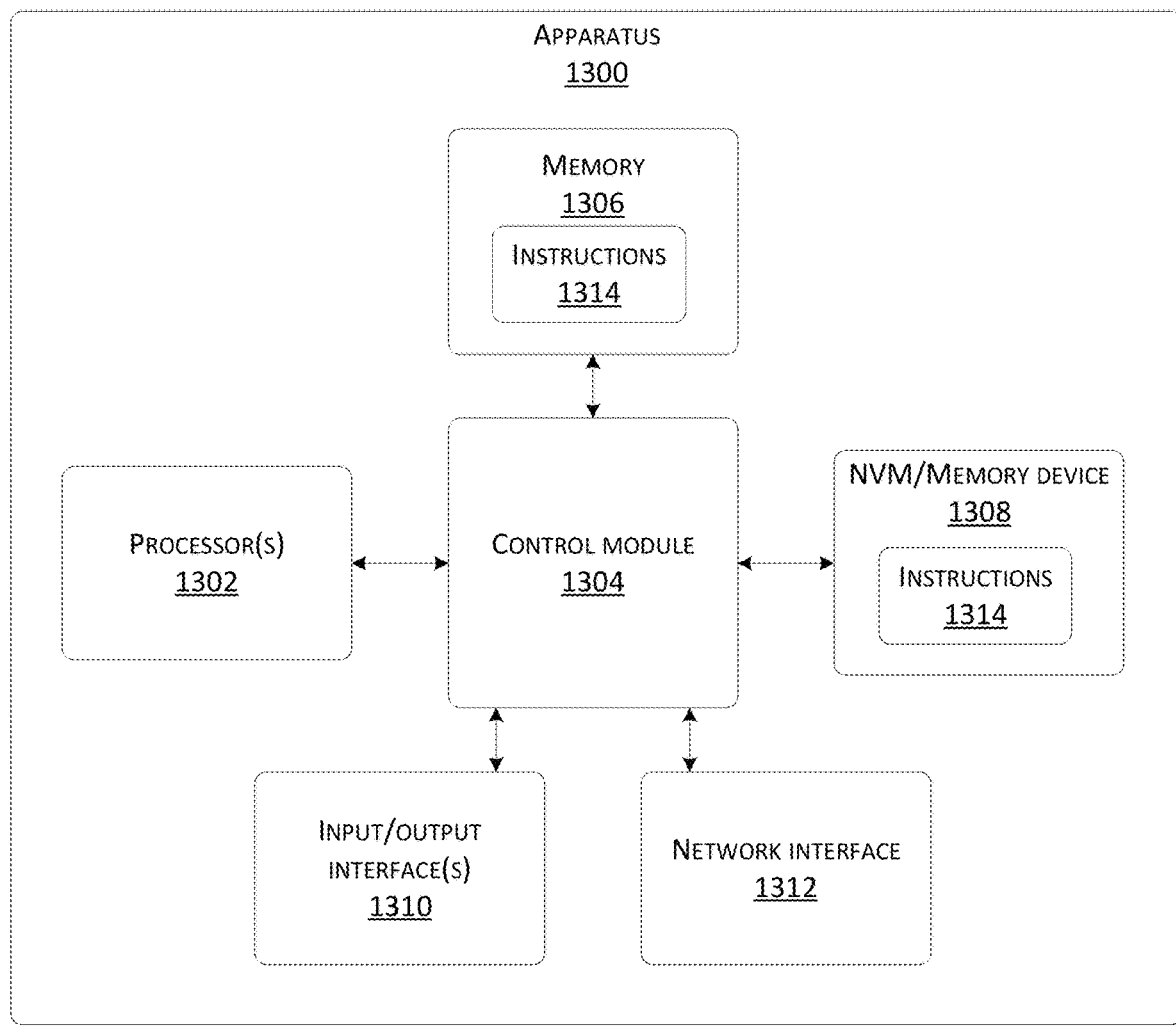
FIG. 13 is a block diagram showing an apparatus according to the embodiments of the present disclosure.

The embodiments of the present disclosure may be implemented as an apparatus having a desired configuration using any suitable hardware, firmware, software, or any combination thereof. FIG. 13 schematically illustrates an exemplary apparatus 1300 (such as the apparatuses 300 and 800, for example) that may be used for implementing various embodiments described in the present disclosure.

In implementations, FIG. 13 shows an example apparatus 1300. The apparatus 1300 includes one or more processors 1302, a control module (chipset) 1304 coupled to at least one of the one or more processors 1302, memory 1306 coupled to the control module 1304, a non-volatile memory (NVM)/memory device 1308 coupled to the control module 1304, one or more input/output devices 1310 coupled to the control module 1304, and a network interface 1312 coupled to control module 1304.

The processor 1302 may include one or more single-core or multi-core processors. The processor 1302 may include any combination of general purpose processor(s) or special purpose processor(s) (e.g., a graphics processor, an application processor, a baseband processor, etc.). In implementations, the apparatus 1300 can be a device such as a server of a transcoding end or the like described in the embodiments of the present disclosure.

In implementations, the apparatus 1300 may include one or more computer-readable media (e.g., the memory 1306 or the NVM/storage 1308) having instructions 1314 and may include the one or more processors 1302 combined with the one or more computer-readable media and configured to execute instructions 1314 to implement actions described in present disclosure.

In implementations, the control module 1304 may include any suitable interface controller to provide any suitable device interface to at least one of the one or more processors 1302 and/or any suitable device or component in communication with the control module 1304.

The control module 1304 may include a memory controller module to provide an interface to the memory 1306. The memory controller module may be a hardware module, a software module, and/or a firmware module.

The memory 1306 may be used for loading and storing data and/or instructions 1314 for apparatus 1300, for example. In implementations, the memory 1306 may include any suitable volatile memory, for example, a suitable DRAM. In implementations, the memory 1306 may include double data rate type four synchronous dynamic random access memory (DDR4 SDRAM).

In implementations, the memory 1306 may include a form of computer readable media such as a volatile memory, a random access memory (RAM) and/or a non-volatile memory, for example, a read-only memory (ROM) or a flash RAM. The memory 1306 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the control module 1304 may include one or more input/output controllers to provide an interface to the NVM/storage 1308 and the one or more input/output devices 1310.

For example, the NVM/storage 1308 may be used for storing data and/or the instructions 1314. The NVM/storage 1308 may include any suitable non-volatile memory (e.g., flash memory), and/or may include any suitable non-volatile storage device (e.g., one or more hard disk drives (HDD), one or more compact disk (CD) drives, and/or one or more digital versatile disk (DVD) drives).

The NVM/storage 1308 may include storage resources that are physically a part of a device installed on the apparatus 1300, or may be accessible by the device and not necessarily as a part of the device. For example, the NVM/storage 1308 may be accessed over a network via at least one of the one or more input/output devices 13010.

The at least one of the one or more input/output devices 1310 may provide an interface for the apparatus 1300 to communicate with any other suitable device(s). The input/output device(s) 1310 may include communication components, audio components, sensor components, and the like.

The network interface 1312 may provide an interface for the apparatus 1300 to communicate over one or more networks, and the apparatus 1300 may perform wireless communications with one or more components of a wireless network, according to one or more wireless network standards and/or protocols, or any standard and/or protocol from the one or more wireless network standards and/or protocols, such as accessing wireless networks based on communication standards such as Wi-Fi, 2G or 3G, or a combination thereof.

In implementations, at least one of the one or more processors 1302 may be logically packaged together with one or more controllers (e.g., memory controller modules) of the control module 1304. In implementations, at least one of one or more processors 1302 may be logically packaged together with one or more controllers of the control module 1304 to form a system in package (SiP). In implementations, at least one of one or more processors 1302 may be logically integrated with one or more controllers of the control module 1304 on the same mold. In implementations, at least one of one or more processors 1302 may be logically integrated with one or more controllers of the control module 1304 on the same mold to form a system on chip (SoC).

In various embodiments, the apparatus 1300 may be, but not limited to, a terminal device such as a server, a desktop computing device, or a mobile computing device (e.g., a laptop computing device, a handheld computing device, a tablet, a netbook, etc.). In various embodiments, the apparatus 1300 may have more or fewer components and/or different architectures. For example, in implementations, the apparatus 1300 may include one or more cameras, keyboards, liquid crystal display (LCD) screens including touchscreen displays, nonvolatile memory ports, multiple antennas, graphics chips, application specific integrated circuits ASIC) and speakers.

The embodiments of the present disclosure provide methods and apparatuses. Example 1 includes a method for processing a panoramic video image including: obtaining a panoramic video image and demarcating the panoramic video image into a primary area and at least one ancillary area; determining a primary quantization parameter corresponding to the primary area and an ancillary quantization parameter corresponding to the ancillary area, wherein the primary quantization parameter is smaller than the ancillary quantization parameter, and the quantization parameter is inversely proportional to an image quality; encoding the primary area based on the primary quantization parameter, encoding the ancillary area based on the ancillary quantization parameter, and determining a coded panoramic video image.

Example 2 includes the method of example 1, wherein demarcating the panoramic video image into the primary area and the at least one ancillary area comprises determining viewing angle information according to a mapping method, using the viewing angle information to demarcate the panoramic video image, and determining the primary area and the at least one ancillary area.

Example 3 includes the method of Example 1 and/or Example 2, wherein the mapping model comprises at least one of a Cubemap mapping method, a Pyramid mapping method, or a Spherical projection method.

Example 4 includes the method of one or more of Examples 1-3, wherein determining the viewing angle information according to the mapping method, using the viewing angle information to demarcate the panoramic video image, and determining the primary area and the at least one ancillary area, include selecting a corresponding viewing path as a target path of a viewing angle for the panoramic video image obtained by a Cubemap mapping method; setting an area corresponding to the target path as the primary area, and setting areas other than the area corresponding to the target path as the ancillary area.

Example 5 includes the method of one or more of Examples 1-4, wherein determining the viewing angle information according to the mapping method, using the viewing angle information to demarcate the panoramic video image, and determining the primary area and the at least one ancillary area, include determining a primary viewing angle area and an ancillary viewing angle area of the panoramic video image for the panoramic video image obtained by a Pyramid mapping method; and determining the primary area based on the primary viewing angle area, and setting the ancillary viewing angle area as the ancillary area.

Example 6 includes the method of one or more of Examples 1-5, wherein determining the primary area based on the primary viewing angle area includes determining the primary area from the primary viewing angle area based on viewing angle information.

Example 7 includes the method of one or more of Examples 1-6, further including setting an area within the primary viewing angle area other than the primary area as the ancillary area.

Example 8 includes the method of one or more of Examples 1-7, wherein viewing angle information is determined according to a mapping method, and demarcating the panoramic video image into the primary area and the at least one ancillary area using the viewing angle information includes determining a viewing angle area for the panoramic video image obtained through a spherical mapping model; and setting the viewing angle area in the panoramic video image as the primary area, and setting an area other than the viewing angle area as the ancillary area.

Example 9 includes the method of one or more of Examples 1-8, wherein setting the area corresponding to the target path as the primary area and setting the area other than the area corresponding to the target path as the ancillary area includes selecting a sub-area within the area corresponding to the target path to be the primary area, and setting sub-areas within the area corresponding to the target path other than the primary area as first level ancillary sub-areas; and demarcating areas corresponding to paths other than the target path into second level ancillary sub-areas to Nth level ancillary sub-areas, wherein N is an integer equal or larger than two.

Example 10 includes the method of one or more of Examples 1-9, wherein setting the ancillary viewing angle area as the ancillary area includes demarcating the ancillary viewing angle area into first level ancillary sub-areas to Nth level ancillary sub-areas, wherein N is an integer equal or larger than two.

Example 11 includes the method of one or more of Examples 1-10, wherein setting the area within the primary viewing angle area other than the primary area as the ancillary area includes setting the area within the primary viewing angle area other than the primary area as a first level ancillary area, and setting the ancillary viewing angle area in the panoramic video image as the ancillary areas includes demarcating the ancillary viewing angle area from the panoramic video image into second level ancillary areas to Nth level ancillary areas, wherein N is an integer equal to or greater than two.

Example 12 includes the method of one or more of Examples 1-11, wherein setting the area other than the viewing angle area as the ancillary area includes demarcating the area other than the viewing angle area into first level ancillary areas to Nth level ancillary areas, wherein N is an integer equal to or greater than two.

Example 13 includes the method of one or more of Examples 1-12, wherein determining the ancillary quantization parameter corresponding to the ancillary area includes separately determining ancillary quantization parameters of different levels corresponding to different levels of the ancillary sub-areas, wherein an ancillary quantization parameter increases as a level thereof increases.

Example 14 includes the method of one or more of Examples 1-13, wherein the Cubemap mapping method includes a Cubemap mapping method with adaptive resolution.

Example 15 includes the method of one or more of Examples 1-14, wherein prior to obtaining the panoramic video image determined by mapping, the method further includes mapping the spherical panoramic image based on a Cubemap mapping method with adaptive resolution.

Example 16 includes the method of one or more of Examples 1-5, wherein mapping the spherical panoramic image based on the Cubemap mapping model with adaptive resolution includes selecting a target mapping plane in a cube of the Cubemap mapping method, and setting other mapping planes in the cube as non-target mapping planes; mapping the spherical panoramic image onto the target mapping plane based on a first sampling value, and mapping the spherical panoramic image onto the non-target mapping planes based on a second sampling value, wherein the first sampling value is two times of the second sampling value; and expanding the mapped panoramic video image.

Example 17 includes the method of one or more of Examples 1-16, wherein mapping the spherical panoramic image onto the mapping plane includes determining pixel positions of sampling points on the mapping plane based on a sampling value; mapping the spherical panoramic image according to the pixel positions, and determining pixel values of mapping positions at the spherical panoramic image, wherein the mapping plane includes the target mapping plane and the non-target mapping planes, and the sampling value includes the first sample value and the second sampling value.

Example 18 includes the method of one or more of Examples 1-17, wherein a mapping position is an intersection point of a line at a spherical surface, wherein the line traverses a sampling point and a center point of the spherical panoramic image.

Example 19 includes the method of one or more of Examples 1-3, wherein the quantization parameter is proportional to a quantization loss of the image.

Example 20 includes a mapping method of a panoramic video image including: determining sampling values corresponding to mapping planes in a Cubemap mapping method; and using the corresponding sampling values to map a spherical panoramic image to obtain a mapped panoramic video image; and expanding the mapped panoramic video image.

Example 21 includes the method of one or more of Example 20, wherein the mapping planes comprises a target mapping plane and non-target mapping planes, and the sampling values comprise a first sampling value and a second sampling value, wherein determining the sampling values corresponding to the mapping planes in the Cubemap mapping method includes selecting the target mapping plane from a cube of the Cubemap mapping method, determining other mapping planes as the non-target mapping planes; and determining the first sampling value corresponding to the target mapping plane and the second sampling value corresponding to the non-target mapping planes.

Example 22 includes the method of one or more of Example 20 and/or Example 21, wherein using the corresponding sampling values to map the spherical panoramic image includes mapping the spherical panoramic image onto the target mapping plane based on the first sampling value, and mapping the spherical panoramic image onto the non-target mapping planes based on the second sampling value, wherein the first sampling value is two times of the second sampling value.

Example 23 includes the method of one or more of Example 20 and/or Example 22, wherein using the corresponding sampling values to map the spherical panoramic image includes determining pixel positions of sampling points on the mapping planes based on the sampling values; mapping the spherical panoramic image according to pixel positions, and determining pixel values of the mapping positions at the spherical panoramic image, wherein a mapping position is an intersection point of a line at a spherical surface, wherein the line traverses a sampling point and a center point of the spherical panoramic image.

Example 24 includes a panoramic video image processing apparatus including: an area demarcation module configured to obtain a panoramic video image and to demarcate the panoramic video image into a primary area and at least one ancillary area; a quantization parameter determination module configured to determine a primary quantization parameter corresponding to the primary area, and an ancillary quantization parameter corresponding to the ancillary area, wherein the primary quantization parameter is smaller than the ancillary quantization parameter, and the quantization parameter is inversely proportional to an image quality; an encoding module configured to encode the primary area according to the primary quantization parameter, encode the ancillary area according to the ancillary quantization parameter, and determine a coded panoramic video image Example 25 includes the apparatus of Example 24, wherein the area demarcation module is configured to determine viewing angle information according to a mapping method, and demarcate the panoramic video image using the viewing angle information to determine the primary area and the at least one ancillary area.

Example 26 includes the apparatus of Example 24 and/or Example 25, wherein the mapping method includes at least one of a Cubemap mapping method, a Pyramid mapping method, or a Spherical projection method.

Example 27 includes the apparatus of one or more of Examples 24-26, wherein the area demarcation module is configured to select a corresponding viewing path as a target path of a viewing angle for the panoramic video image obtained by a Cubemap mapping method, set an area corresponding to the target path as the primary area, and set areas other than the area corresponding to the target path as the ancillary area.

Example 28 includes the apparatus of one or more of Examples 24-27, wherein the area demarcation module is configured to determine a primary viewing angle area and an ancillary viewing angle area of the panoramic video image for the panoramic video image obtained by a Pyramid mapping method; determining the primary area based on the primary viewing angle area, and setting the ancillary viewing angle area as the ancillary area.

Example 29 includes the apparatus of one or more of Examples 24-28, wherein the area demarcation module is configured to determine the primary area from the primary viewing angle area based on viewing angle information, and set an area within the primary viewing angle area other than the primary area as the ancillary area.

Example 30 includes the apparatus of one or more of Examples 24-29, wherein the area demarcation module is configured to determine a viewing angle area for the panoramic video image obtained through a spherical mapping model; and set the viewing angle area in the panoramic video image as the primary area, and set an area other than the viewing angle area as the ancillary area.

Example 31 includes the apparatus of one or more of Examples 24-30, wherein the area demarcation module is configured to select a sub-area within the area corresponding to the target path to be the primary area, and set sub-areas within the area corresponding to the target path other than the primary area as first level ancillary sub-areas; and demarcate areas corresponding to paths other than the target path into second level ancillary sub-areas to Nth level ancillary sub-areas, wherein N is an integer equal or larger than two.

Example 32 includes the apparatus of one or more of Examples 24-31, wherein the area demarcation module is configured to demarcate the ancillary viewing angle area into first level ancillary sub-areas to Nth level ancillary sub-areas; or setting the area within the primary viewing angle area other than the primary area as a first level ancillary area, and demarcating the ancillary viewing angle area from the panoramic video image into second level ancillary areas to Nth level ancillary areas, wherein N is an integer equal to or greater than two.

Example 33 includes the apparatus of one or more of Examples 24-32, wherein the area demarcation module is configured to demarcate the area other than the viewing angle into level one ancillary sub-area to level N ancillary sub-area, wherein N is an integer equal or larger than 2.

Example 34 includes the apparatus of one or more of Examples 24-23, wherein the quantization parameter determination module is configured to separately determine ancillary quantization parameters of different levels corresponding to different levels of the ancillary sub-areas, wherein an ancillary quantization parameter increases as a level thereof increases.

Example 35 includes the apparatus of one or more of Examples 24-34, wherein the Cubemap mapping method includes a Cubemap mapping method with adaptive resolution, and the apparatus further includes a mapping module configured to mapping the spherical panoramic image based on the Cubemap mapping method with adaptive resolution.

Example 36 includes the apparatus of one or more of Examples 24-35, wherein the mapping module includes a mapping plane determination sub-module configured to select a target mapping plane in a cube of the Cubemap mapping method, and setting other mapping planes in the cube as non-target mapping planes; and a mapping processing sub-module configured to map the spherical panoramic image onto the target mapping plane based on a first sampling value, and map the spherical panoramic image onto the non-target mapping planes based on a second sampling value, wherein the first sampling value is two times of the second sampling value; and expanding the mapped panoramic video image.

Example 37 includes the apparatus of one or more of Examples 24-36, wherein the mapping processing sub-module is configured to determine pixel positions of sampling points on the mapping plane based on a sampling value, map the spherical panoramic image according to the pixel positions, and determine pixel values of mapping positions at the spherical panoramic image, wherein the mapping plane includes the target mapping plane and the non-target mapping planes, the sampling value includes the first sample value and the second sampling value, and a mapping position is an intersection point of a line at a spherical surface, wherein the line traverses a sampling point and a center point of the spherical panoramic image.

Example 38 includes the apparatus of one or more of Examples 24-37, wherein the quantization parameter is proportional to a quantization loss of the image.

Example 39 includes a panoramic video image mapping apparatus including: an image mapping module configured to determine sampling values corresponding to mapping planes in a Cubemap mapping method, and use the corresponding sampling values to map a spherical panoramic image to obtain a mapped panoramic video image, and an image expansion module configured to expand the mapped panoramic video image.

Example 40 includes the apparatus of Example 39, wherein the mapping plane comprises a target mapping plane and non-target mapping planes, and the sampling values comprise a first sampling value and a second sampling value, wherein the image mapping module configured to select the target mapping plane from a cube of the Cubemap mapping method, determine other mapping planes as the non-target mapping planes, and determine the first sampling value corresponding to the target mapping plane and the second sampling value corresponding to the non-target mapping planes.

Example 41 includes the apparatus of Example 39 and/or Example 40, wherein the image mapping module is configured to map the spherical panoramic image onto the target mapping plane based on the first sampling value, and map the spherical panoramic image onto the non-target mapping planes based on the second sampling value, wherein the first sampling value is two times of the second sampling value.

Example 42 includes the apparatus of Examples 39-41, wherein the image mapping module is configured to determine pixel positions of sampling points on the mapping planes based on the sampling values, map the spherical panoramic image according to pixel positions, and determine pixel values of the mapping positions at the spherical panoramic image, wherein a mapping position is an intersection point of a line at a spherical surface, wherein the line traverses a sampling point and a center point of the spherical panoramic image.

Example 43 includes an apparatus including: one or more processors; and one or more machine-readable media having stored thereon instructions that, when executed by the one or more processors, cause the apparatus to perform the method of one or more of Examples 1-19.

Example 44 includes one or more machine-readable media storing instructions that, when executed by one or more processors, causes an apparatus to perform the method of one or more of Examples 1-19.

Example 45 includes an apparatus including: one or more processors; and one or more machine-readable media having stored thereon instructions that, when executed by the one or more processors, cause the apparatus to perform the method of one or more of Examples 20-23.

Example 46 includes one or more machine-readable media storing instructions that, when executed by one or more processors, causes an apparatus to perform the method of one or more of Examples 20-23.

Although certain embodiments are used for explanation and description, various alternatives and/or equivalents of implementation solutions, or implementations that are obtained to achieve the same purpose as shown and described in the embodiments, all fall within the scope of the present disclosure. The present disclosure is intended to cover all modifications, adaptations or variations of the embodiments discussed herein. Therefore, it is apparent that the embodiments described herein are limited only by the claims and their equivalents.

What is claimed is:

1. A method comprising:
   mapping a spherical panoramic image based on a Cubemap mapping model with adaptive resolution;
   obtaining a panoramic video image from the mapping;
   demarcating the panoramic video image into a primary area and one or more ancillary areas;
   determining a primary quantization parameter corresponding to the primary area, and respective one or more ancillary quantization parameters corresponding to the one or more ancillary areas, wherein the primary quantization parameter is smaller than the respective one or more ancillary quantization parameters; and
   encoding the primary area according to the primary quantization parameter and encoding the one or more ancillary areas according to the respective one or more ancillary quantization parameters to obtain a coded panoramic video image.

2. The method of claim 1, wherein the demarcating the panoramic video image into the primary area and the one or more ancillary areas comprises:
   determining viewing angle information according to a mapping model; and
   demarcating the panoramic video image into the primary area and the one or more ancillary areas using the viewing angle information.

3. The method of claim 1, wherein the demarcating the panoramic video image into the primary area and the at least one ancillary area comprises:
   determining a primary viewing angle area and an ancillary viewing angle area of the panoramic video image;
   determining the primary area based on the primary viewing angle area; and
   setting the ancillary viewing angle area as at least one ancillary area of the one or more ancillary areas.

4. The method of claim 3, wherein the setting the ancillary viewing angle area as the at least one ancillary area comprises demarcating the ancillary viewing angle area into first level ancillary sub-areas to Nth level ancillary sub-areas, wherein N is an integer equal or larger than two.

5. The method of claim 3, wherein the determining the primary area based on the primary viewing angle area comprises determining the primary area from the primary viewing angle area based on viewing angle information, and the one or more ancillary areas further comprises an area within the primary viewing angle area other than the primary area.

6. The method of claim 5, wherein the demarcating the panoramic video image into the primary area and the one or more ancillary areas comprises setting the area within the primary viewing angle area other than the primary area as a first level ancillary area, and demarcating the ancillary viewing angle area into second level ancillary areas to Nth level ancillary areas, wherein N is an integer equal to or greater than two.

7. The method of claim 1, wherein the demarcating the panoramic video image into the primary area and the one or more ancillary areas comprises:
   determining a viewing angle area for the panoramic video image obtained; and
   setting the viewing angle area in the panoramic video image as the primary area, and setting an area other than the viewing angle area as the one or more ancillary areas.

8. The method of claim 1, wherein the demarcating the panoramic video image into the primary area and the one or more ancillary areas comprises:
   selecting a corresponding viewing path as a target path of a viewing angle for the panoramic video image; and
   setting an area corresponding to the target path as the primary area; and
   setting areas other than the area corresponding to the target path as the one or more ancillary areas.

9. The method of claim 8, wherein the setting the area corresponding to the target path as the primary area, and setting the areas other than the area corresponding to the target path as the one or more ancillary areas, comprise:
   selecting a sub-area within the area corresponding to the target path to be the primary area, and setting sub-areas within the area corresponding to the target path other than the primary area as first level ancillary sub-areas; and
   demarcating areas corresponding to paths other than the target path into second level ancillary sub-areas to Nth level ancillary sub-areas, wherein N is an integer equal or larger than two.

10. A method of claim 1, wherein the determining the respective one or more ancillary quantization parameters corresponding to the one or more ancillary areas comprises separately determining ancillary quantization parameters of different levels corresponding to different levels of ancillary sub-areas, wherein an ancillary quantization parameter is increased as a level thereof is increased.

11. The method of claim 1, wherein the mapping the spherical panoramic image based on the Cubemap mapping model with adaptive resolution comprises:
   selecting a target mapping plane in a cube of the Cubemap mapping model, and setting other mapping planes in the cube as non-target mapping planes;
   mapping the spherical panoramic image onto the target mapping plane based on a first sampling value, and mapping the spherical panoramic image onto the non-target mapping planes based on a second sampling value, wherein the first sampling value is larger than the second sampling value; and
   expanding the mapped panoramic video image.

12. The method of claim 1, wherein the mapping the spherical panoramic image based on the Cubemap mapping model with adaptive resolution comprises:
   determining pixel positions of sampling points on mapping planes based on sampling values; and
   mapping the spherical panoramic image according to the pixel positions, determining pixel values of mapping positions at the spherical panoramic image, wherein the mapping planes includes a target mapping plane and non-target mapping planes, and the sampling values includes a first sample value and a second sampling value.

13. The method according to claim 12, wherein a particular mapping position of the mapping positions is an intersection point of a line at a spherical surface, wherein the line traverses a particular sampling point of the sampling points and a center point of the spherical panoramic image.

14. One or more computer readable media storing executable instructions that, when executed by one or more processors, cause the one or more processors to perform acts comprising:

determining sampling values corresponding to mapping planes;

using the sampling values to map a spherical panoramic image into different viewing angle areas based on a Cubemap mapping model with adaptive resolution to obtain a mapped panoramic video image; and expanding the mapped panoramic video image.

15. The one or more computer readable media of claim 14, wherein the mapping plane comprises a target mapping plane and non-target mapping planes, and the sampling values comprise a first sampling value and a second sampling value, wherein the determining the sampling values corresponding to mapping planes comprises determining the sampling values corresponding to the mapping planes in a Cubemap mapping model, the determining the sampling values corresponding to the mapping planes in the Cubemap mapping model comprises:

selecting the target mapping plane in a cube of the Cubemap mapping model, and setting other mapping planes in the cube as the non-target mapping planes; and determine the first sampling value corresponding to the target mapping plane and the second sampling value corresponding to the non-target mapping planes.

16. The one or more computer readable media of claim 15, wherein the using the sampling values to map the spherical panoramic image comprises mapping the spherical panoramic image onto the target mapping plane based on the first sampling value, and mapping the spherical panoramic image onto the non-target mapping planes based on the second sampling value, wherein the first sampling value is larger than the second sampling value.

17. The one or more computer readable media of claim 14, wherein the using the sampling values to map the spherical panoramic image comprises:

determining pixel positions of sampling points on the mapping planes based on the sampling values; and mapping the spherical panoramic image according to the pixel positions, determining pixel value of mapping positions at the spherical panoramic image, wherein a particular mapping position of the mapping positions is an intersection point of a line at a spherical surface, wherein the line traverses a particular sampling point of the sampling points and a center point of the spherical panoramic image.

18. An apparatus comprising:

one or more processors;

one or more memories storing executable instructions that, executable by the one or more processors, cause the one or more processors to perform acts comprising:

mapping a spherical panoramic image based on a Cubemap mapping model with adaptive resolution;

obtaining a panoramic video image from the mapping;

demarcating the panoramic video image into a primary area and one or more ancillary areas;

determining a primary quantization parameter corresponding to the primary area, and respective one or more ancillary quantization parameters corresponding to the one or more ancillary areas, wherein the primary quantization parameter is smaller than the one or more ancillary quantization parameters; and encoding the primary area according to the primary quantization parameter and encode the one or more ancillary areas according to the respective one or more ancillary quantization parameters to determine a coded panoramic video image.

19. The apparatus of claim 18, wherein the demarcating the panoramic video image into a primary area and one or more ancillary areas comprises:

determining viewing angle information according to a mapping method; and demarcating the panoramic video image using the viewing angle information to determine the primary area and the one or more ancillary areas.

20. The apparatus of claim 18, wherein the demarcating the panoramic video image into a primary area and one or more ancillary areas comprises:

selecting a corresponding viewing path as a target path of a viewing angle for the panoramic video image;

setting an area corresponding to the target path as the primary area; and setting areas other than the area corresponding to the target path as the one or more ancillary areas.

* * * * *